(12) United States Patent
Fujita et al.

(10) Patent No.: US 6,541,755 B1
(45) Date of Patent: Apr. 1, 2003

(54) NEAR FIELD OPTICAL PROBE AND MANUFACTURING METHOD THEREOF

(75) Inventors: Shunsuke Fujita, Kanagawa (JP); Motoichi Ohtsu, Kanagawa (JP); Motonobu Kourogi, Kanagawa (JP)

(73) Assignees: Ricoh Company, Ltd., Tokyo (JP); Kanagawa Academy of Science and Technology, Kawasaki (JP)

(*) Notice: Subject to any disclaimer, the term of this patent is extended or adjusted under 35 U.S.C. 154(b) by 0 days.

(21) Appl. No.: 09/448,152

(22) Filed: Nov. 24, 1999

(30) Foreign Application Priority Data

Nov. 25, 1998 (JP) .......................... 10-334505
Nov. 25, 1998 (JP) .......................... 10-334506
May 31, 1999 (JP) .......................... 11-151923

(51) Int. Cl.[7] ................................ H01J 3/14
(52) U.S. Cl. ................... 250/216; 250/214.1
(58) Field of Search .................. 20/216, 234, 559.29, 20/214.1, 306–311; 369/44.14, 126

(56) References Cited

U.S. PATENT DOCUMENTS 5,583,286 A  * 12/1996  Matsuyama .................. 73/105

FOREIGN PATENT DOCUMENTS

JP            9-198830              7/1997

OTHER PUBLICATIONS

Motoichi Ohtsu, et al. "Near Field Optics and Its Application to Optical Memory," The Institute of Electronics, Information and Communication Engineers, C–I, vol. J81–C–I, No. 3, Mar. 1998, pp. 119–126.

* cited by examiner

Primary Examiner—Que T. Le
Assistant Examiner—Thanh X. Luu
(74) Attorney, Agent, or Firm—Oblon, Spivak, McClelland, Maier & Neustadt, P.C.

(57) ABSTRACT

In a near field optical probe, a through hole having an aperture is provided in a semiconductor photodetector including at least a first-conductive-type high-concentration impurity layer, a first-conductive-type low-concentration impurity layer and a second-conductivity impurity-introduced region.

41 Claims, 17 Drawing Sheets

NEAR FIELD OPTICAL PROBE AND MANUFACTURING METHOD THEREOF

BACKGROUND OF THE INVENTION

1. Field of the Invention

The present invention generally relates to a probe used for an optical memory such as an optical disc, an optical card, an optical tape, or the like, to which information is recorded, from which information is reproduced, and from which information is erased, using light, and, in particular, to a near field optical probe which generates the optical near field and detects scattered light generated through the optical near field and a manufacturing method thereof.

2. Description of the Related Art

In an optical memory, which has been put to practical use, a laser spot, obtained from converging laser light to the diffraction limit, is caused to be incident on a recording medium. At this time, information is recorded on the recording medium as a result of thermal and magnetic modulation being performed on a recording layer of the recording medium. Further, by detecting the intensities of reflected light modulated by record bits, the information is reproduced. In such information recording means, the recording density of the recording medium is approximately determined by the laser wavelength. In order to cope with a recent increase in an information amount processed in various types of information apparatuses such as computers and so forth, a large-capacity memory which achieves a recording density which is obtained as a result of the diffraction limit being exceeded has been demanded. As a promised next-generation large-capacity memory such as that mentioned above, an optical memory on which information recording, reproducing and erasing are performed using the optical near field was proposed. Examples thereof will now be described.

(1) 'Near Field Optics and Its Application to Optical Memory,' a thesis journal of the Institute of Electronics, Information and Communication Engineers, C-I, Vol. J81-C-I, No. 3, Pages 119–126, March, 1998, proposes a device in which a two-dimensional aperture row is formed in a silicon substrate using a semiconductor-plane-process technique, and the optical near fields are generated on the apertures by light which has been incident on the top surface of the silicon substrate. Further, this literature suggests a possibility of integration with a photodetector array.

(2) Japanese Laid-Open Patent Application No. 9-198830 discloses that, in a high-density recording apparatus using the optical near field, in order to stably generate the optical near field in proximity to a recording medium, a high-density recording is performed using a slider in which a circular-cone-shape through hole having an aperture is provided.

Thus, the device in which the two-dimensional aperture row is formed in the silicon substrate using the semiconductor-plane-process technique, and the optical near fields are generated on the apertures by light which has been incident on the top surface of the silicon substrate, was proposed. When a photodetector is integrated into such a device, it is possible to miniaturize such a near field optical probe, and to improve efficiency in detection because it is possible that scattered light and so forth generated through the optical near field can be received in the proximity.

SUMMARY OF THE INVENTION

An object of the present invention is to provide a specific structure and a manufacturing method of a near field optical probe having an arrangement in which an aperture for generating the optical near field which was proposed and a semiconductor photodetector (photodiode: PD) are integrated so as to be combined.

Another object of the present invention is to provide a near field optical probe which can perform a light-detecting operation stably at high speed while generating the optical near field from an aperture.

Another object of the present invention is to provide a manufacturing method of a near field optical probe in which, when an arrangement in which a through hole is surrounded by a ring-shaped high-concentration impurity region along the direction of the through hole is produced, it is easy to form the high-concentration impurity region to a deep portion of the through hole.

Another object of the present invention is to simplify a manufacturing method of a near field optical probe in which a metal film for shading necessary for generation of the optical near field and a terminal which is a component of a photodetector are formed simultaneously.

In a near field optical probe, according to the present invention, a through hole having an aperture is provided in a semiconductor photodetector including at least a first-conductive-type high-concentration impurity layer, a first-conductive-type low-concentration impurity layer and a second-conductivity-type impurity-introduced region.

In this arrangement, by integration of the aperture for generating the optical near field and the semiconductor photodetector (photodiode: PD), which integration has been proposed in the related art, it is possible to miniaturize the near field optical probe and to remarkably improve detection of diffused light generated through the optical near field.

A method for manufacturing the above-described near field optical probe, according to another aspect of the present invention, in which probe the through hole having the aperture is provided in the semiconductor photodetector including at least the first-conductive-type high-concentration impurity layer, the first-conductive-type low-concentration impurity layer and the second-conductivity-type impurity-introduced region, comprises the steps of:

a) forming the second-conductive-type impurity-introduced region in the surface of the first-conductive-type low-concentration impurity layer of a semiconductor substrate having the first-conductive-type high-concentration impurity layer and first-conductive-type low-concentration impurity layer;

b) forming the through hole, which passes through the first-conductive-type high-concentration impurity layer and first-conductive-type low-concentration impurity layer, from the side of the first-conductive-type high-concentration impurity layer, after the step a); and c) forming the aperture in the second-conductive-type impurity-introduced region, after the step b).

In this method, it is possible to cope with various variations in conditions at the time of forming the through hole and manufacture the above-described near field optical probe.

A method for manufacturing the above-described near field optical probe, according to another aspect of the present invention, in which probe the through hole having the aperture is provided in the semiconductor photodetector including at least the first-conductive-type high-concentration impurity layer, first-conductive-type low-concentration impurity layer and second-conductivity-type impurity-introduced region, comprises the steps of:

a) forming the through hole, which passes through the first-conductive-type high-concentration impurity layer and first-conductive-type low-concentration impurity layer, from the side of the first-conductive-type high-concentration impurity layer; and b) forming the second-conductive-type impurity-introduced region in the surface of the first-conductive-type low-concentration impurity layer of a semiconductor substrate having the first-conductive-type high-concentration impurity layer and first-conductive-type low-concentration impurity layer, after the step a).

In this method, it is possible to prevent conditions from being complicated due to differences in conductive-type at the time of forming the through hole, and manufacture the near field optical probe stably.

In a near field optical probe, according to another aspect of the present invention, in which probe a through hole having an aperture is provided in a semiconductor photo-detector including at least a first-conductive-type high-concentration impurity layer, a first-conductive-type low-concentration impurity layer and a second-conductivity-type impurity-introduced region, the second-conductive-type impurity-introduced region is provided separately from the aperture.

In this arrangement, because the second-conductive-type impurity-introduced region is provided separately from the aperture, it is possible to prevent a path of an electric current extending from the second-conductive-type impurity-introduced region and passing directly through the surface of the through hole from developing, and, thereby, it is possible to achieve a stable operation of the semiconductor photo-detector.

In a near field optical probe, according to another aspect of the present invention, in probe which a through hole having an aperture is provided in a semiconductor photo-detector including at least a first-conductive-type high-concentration impurity layer, a first-conductive-type low-concentration impurity layer and a second-conductivity-type impurity-introduced region, the through hole is surrounded by a ring-shaped first-conductive-type impurity region provided along the direction of the through hole in the first-conductive-type low-concentration impurity layer.

In this arrangement, because the through hole is surrounded by the ring-shaped first-conductive-type impurity region provided along the direction of the through hole in the first-conductive-type low-concentration impurity layer, this ring-shaped first-conductive-type impurity region functions as a preventing layer such that, although a depletion layer extending from the second-conductive-type impurity-introduced region along the direction of the surface of the through hole grows along the surface of the through hole at the time of reverse bias or zero bias, the growth of the depletion layer stops within a slight amount. Thereby, it is possible to prevent development or increase of a surface leakage current due to development of a channel along the through hole.

In the above-described near field optical probe, the ring-shaped first-conductive-type impurity-introduced region may be provided so as to be connected to the first-conductive-type high-concentration impurity layer.

Thereby, the ring-shaped first-conductive-type high-concentration impurity region has not only the above-described function of preventing growth of the channel, but also a function of a substrate-side high-concentration impurity layer of a so-called PIN-type PD. Thus, it is possible to optoelectrically transduce light received in the proximity of the aperture so as to effectively draw the light as an electric current. That is, it is possible to increase the efficiency of light detection in the proximity of the aperture.

In a near field optical probe, according to another aspect of the present invention, in which probe a through hole having an aperture is provided in a semiconductor photo-detector including at least a first-conductive-type high-concentration impurity layer, a first-conductive-type low-concentration impurity layer and a second-conductivity-type impurity-introduced region, a first-conductive-type high-concentration impurity-introduced region is provided at a portion spreading from and in the proximity of the surface of the first-conductive-type low-concentration impurity layer, has a plane shape containing the aperture and is separate from the second-conductive-type impurity-introduced region.

In this arrangement, it is possible to prevent a channel from extending from the second-conductive-type impurity-introduced region along the surface of the near field optical probe.

In the above-described near field optical probe, the through hole may be surrounded by a ring-shaped first-conductive-type high-concentration impurity region extending along the direction of the through hole in the first-conductive-type low-concentration impurity layer, and, also, the ring-shaped first-conductive-type high-concentration impurity region may be provided so as to be connected to the first-conductive-type high-concentration impurity-introduced region having the plane shape containing the aperture and formed separate from the second-conductive-type impurity-introduced region.

In this arrangement, it is possible to prevent a channel from extending from the second-conductive-type impurity-introduced region along the surface of the near field optical probe, and, also, along the surface of the through hole. Thereby, it is possible to positively achieve reduction in leakage current.

In the above-described near field optical probe, a dielectric film may be provided on the surface, of at least the first-conductive-type low-concentration impurity layer, of the through hole.

This dielectric film functions as a protective film for the surface of the semiconductor surface, and can prevent a leakage current from developing in the semiconductor photodetector due to defects, impurities or the like in interfaces. Further, in a case where a metal film is laminated, the dielectric film functions as an insulative film. Thereby, it is possible to prevent operation failure of the photodetector due to time-elapse deterioration or leakage, and to prevent a short circuit due to the lamination of the metal film.

A method for manufacturing the near field optical probe, according to another aspect of the present invention, comprises the step of impurity diffusion using an impurity in a gas phase, which step is performed when the ring-shaped first-conductive-type high-concentration impurity region extending along the direction of the through hole is formed.

In this method, even when the sectional shape of the through hole is a vertical shape or a relatively steep taper shape, it is possible to form the ring-shaped first-conductive-type high-concentration impurity region surrounding the through hole, because the impurity diffusion using the impurity in the gas phase is used.

In the above-described near field optical probe, metal films may be provided on the surface of the through hole and the surface of the first-conductive-type high-concentration impurity layer.

Thereby, the metal film provided on the through hole functions as a shading film for preventing light from penetrating the substrate when the light is incident on the through hole for the purpose of generation of the optical near field and a reflecting film for necessity from the optical near field generation principle or increase of the optical near field. Further, the metal film provided on the surface of the first-conductive-type high-concentration impurity layer functions as a conductive path to a circuit for light detection and so forth.

A method for manufacturing the near field optical probe, according to another aspect of the present invention, comprises the step of forming, at the same time, the metal film on the surface of the through hole and the metal film on the surface of the first-conductive-type high-concentration impurity layer.

In this method, it is possible to omit a process and to improve the manufacturing efficiency.

In a near field optical probe, according to another aspect of the present invention, in which probe a through hole having an aperture is provided in a substrate in which a semiconductor photodetector is formed, a light-receiving region of the semiconductor photodetector is provided so as to be limited to the proximity of the aperture.

In this arrangement, because the light-receiving region of the semiconductor photodetector is provided so as to be limited to the proximity of the aperture, it is possible to prevent an increase in a CR time constant, and to achieve the near field optical probe which can operate at high speed.

In a near field optical probe, according to another aspect of the present invention, in which probe through holes having a plurality of apertures are provided in a substrate in which a semiconductor photodetector is formed, a light-receiving region of the semiconductor photodetector is provided so as to be limited to the proximity of each of the plurality of apertures, and, also, a plurality of the light-receiving regions are electrically connected with each other.

In this arrangement, because the light-receiving region of the semiconductor photodetector is provided to be limited to the proximity of each of the plurality of apertures, and, also, the plurality of the light-receiving regions are electrically connected with each other, even in a case where the area of the near field optical probe formed as an array increases, it is possible to prevent an increase in a CR time constant, and to achieve the near field optical probe which can operate at high speed.

In a near field optical probe, according to another aspect of the present invention, in which probe a through hole having an aperture is provided in a substrate in which a semiconductor photodetector is formed, a surface of a wiring layer which is connected to a light-receiving region of the photodetector does not project from an imaginary plane including the surface of the aperture.

In this arrangement, because the surface of the wiring layer which is connected to the light-receiving region of the photodetector does not project from the imaginary plane including the surface of the aperture, it is possible to achieve a near field optical probe, the aperture of which can be placed so close to an object that the distance therebetween is equal to or less than an amount on the order of tens of nm.

In a near field optical probe, according to another aspect of the present invention, in which probe a through hole having an aperture is provided in a substrate in which a semiconductor photodetector is formed, a wiring layer which is electrically connected to a light-receiving region of the photodetector is provided along a through hole provided in the substrate.

In this arrangement, because the wiring layer which is electrically connected to the light-receiving region of the photodetector is provided along the through hole provided in the substrate, it is possible to achieve an arrangement in which, without adversely affecting the function of the near field optical probe, electrical connection to a wiring element on the rear surface from a wiring element of the photodetector on the side of the light-receiving surface can be made.

Other objects and further features of the present invention will become more apparent from the following detailed description when read in conjunction with the accompanying drawings.

DETAILED DESCRIPTION OF THE PREFERRED EMBODIMENTS

In each of near field optical probes according to the present invention, a through hole having a single aperture or through holes having a row of apertures in one dimension or two dimensions is (are) provided in a substrate, and the size of the aperture is smaller than the wavelength of light to be used. Thereby, the optical near field is generated in the aperture by light incident on the top surface of the substrate. Further, a photodetector or photodetector array which receives scattered light due to interaction between the optical near field and another substance is integrated into the substrate.

Arrangements and operations of first through ninth embodiments of near field optical probes according to the present invention, shown in figures, will now be described.

Figure 1:
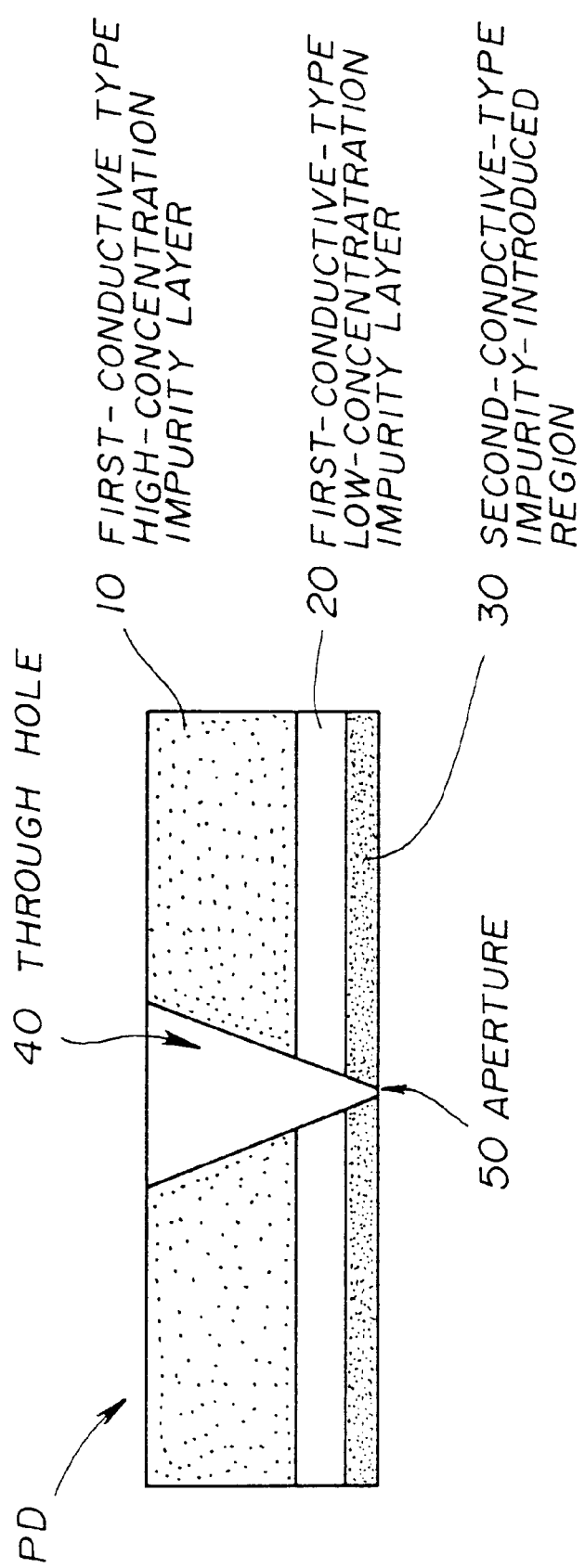
FIG. 1 shows a general essential-portion sectional view of a first embodiment of a near field optical probe according to the present invention.

FIG. 1 shows a general essential-portion sectional view of the first embodiment of the near field optical probe according to the present invention.

The semiconductor photodetector used in the first embodiment of the near field optical probe according to the present invention is a photodiode (PD) having a PIN arrangement, and can operate with high efficiency at high speed. For example, as shown in FIG. 1, the semiconductor photodetector includes at least a first-conductive-type high-concentration impurity layer 10, a first-conductive-type low-concentration impurity layer 20 and a second-conductive-type impurity-introduced region 30. As the above-mentioned first-conductive-type high-concentration impurity layer 10, for example, a silicon (Si) substrate doped with antimony (Sb) in high concentration, and which has a resistivity on the order of 0.01 Ωcm can be considered. As the first-conductivity-type low-concentration impurity layer 20, a silicon epitaxial layer doped with phosphorus (P) and which has a resistivity of equal to or more than an amount on the order of 100 Ωcm can be considered. As the second-conductive-type impurity-introduced region 30, a region resulting from boron (B) being diffused in the above-mentioned first-conductive-type low-concentration impurity layer can be considered. In this case, a p+ n– n+ type photodetector is obtained. However, it is also possible to invert the conductivity types so as to obtain an n+ p– p+ type photodetector. Wiring elements, not shown in the figure, are connected to the first-conductivity-type high-concentration impurity layer 10 and the second-conductivity-type impurity-introduced region 30, and, thereby, conductive paths to a light-detecting circuit are formed.

Further, when the near field optical probe is formed, a through hole 40 having an aperture 50 is provided in the above-mentioned photodetector (photodiode: PD). As a method for forming the through hole, a method in which anisotropic etching using the plane orientation of the silicon crystal is used, as disclosed in the above-mentioned literature (1) ('Near Field Optics and Its Application to Optical Memory'), may be used, or a common dry or wet etching may be used.

In FIG. 1, only one through hole is shown. However, it is possible to provide an array of apertures as a result of providing a plurality of through holes in the semiconductor photodetector.

Figure 2A:
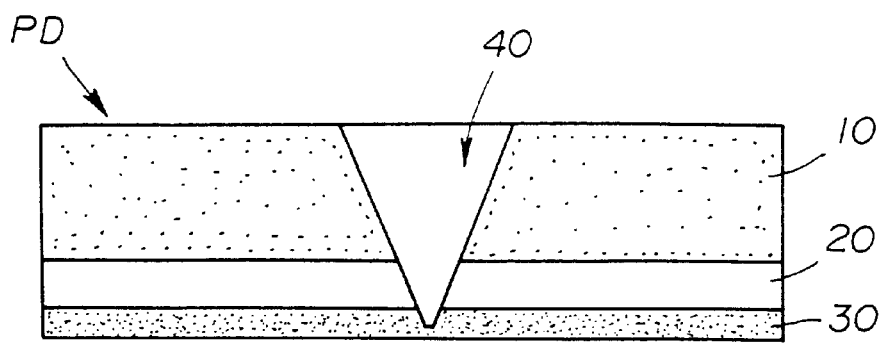
FIGS. 2A–2C show a first embodiment of a method for manufacturing the near field optical probe according to the present invention, and illustrate a process of manufacturing the first embodiment of the near field optical probe according to the present invention shown in FIG. 1.
Figure 2B:
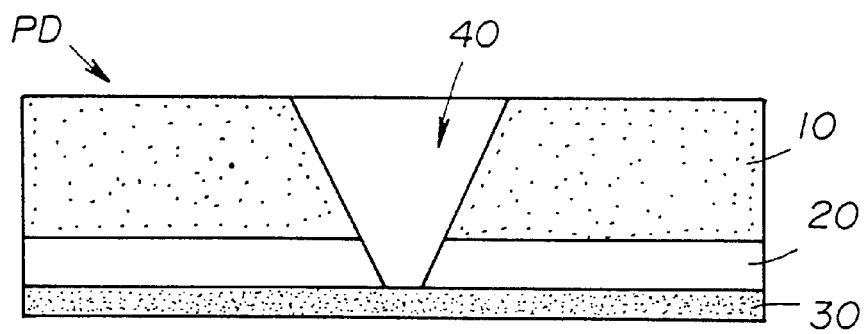
Figure 2C:
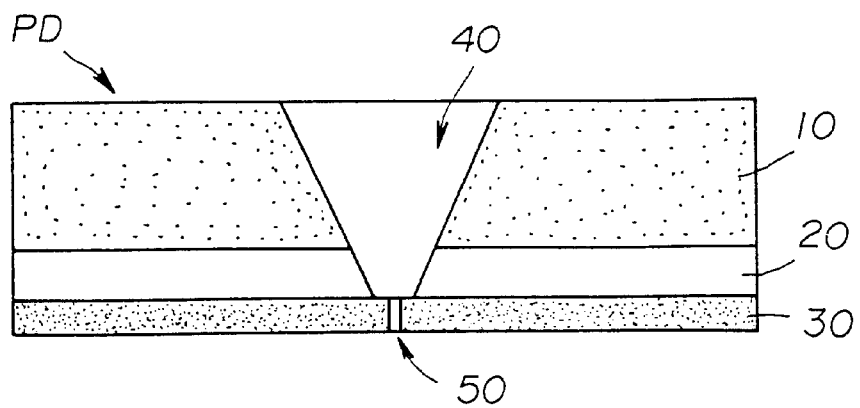

FIGS. 2A–2C show a first embodiment of a method for manufacturing the near field optical probe according to the present invention, and illustrate a process of manufacturing the first embodiment of the near field optical probe according to the present invention shown in FIG. 1.

Figure 3A:
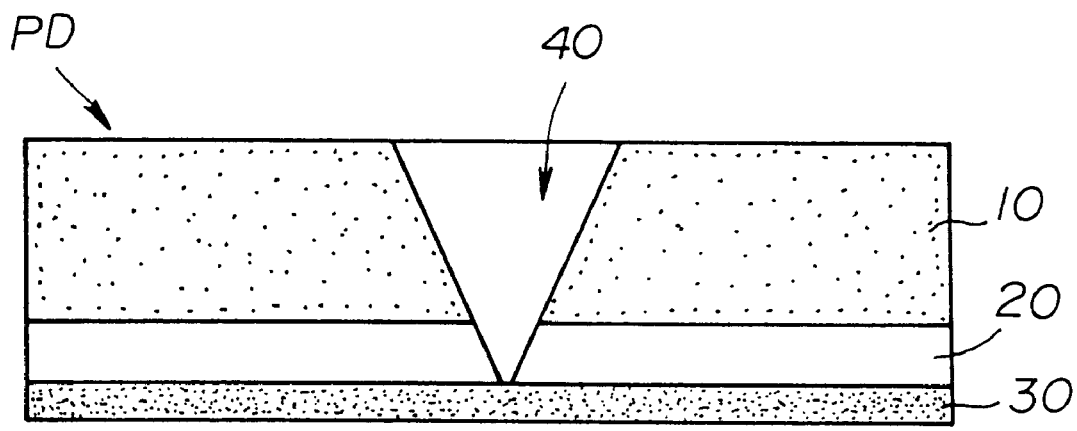
FIGS. 3A–3B show a second embodiment of a method for manufacturing the near field optical probe according to the present invention, and illustrate another process of manufacturing the first embodiment of the near field optical probe according to the present invention shown in FIG. 1.
Figure 3B:
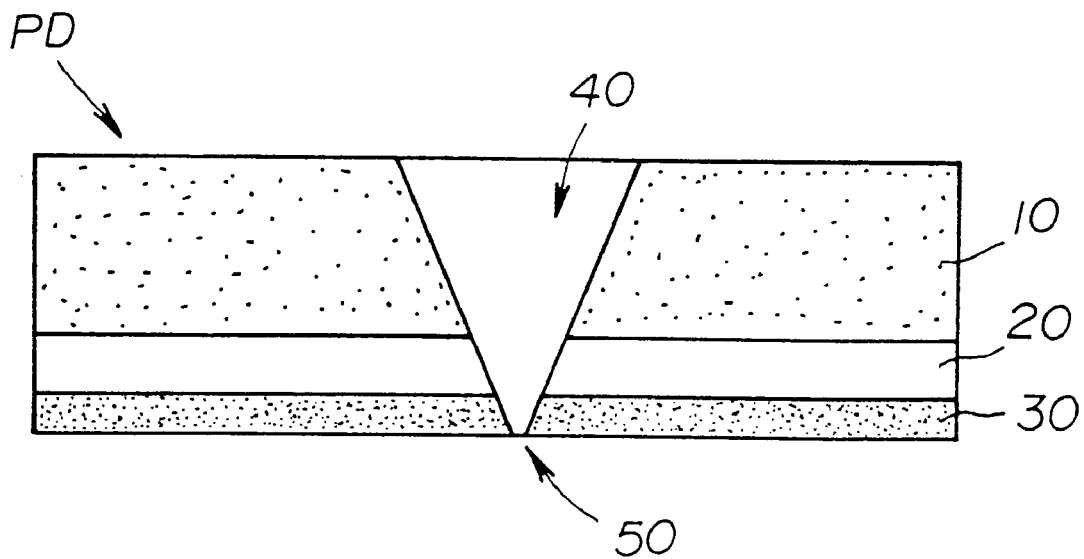

FIGS. 3A–3B show a second embodiment of a method for manufacturing the near field optical probe according to the present invention, and illustrate another process of manufacturing the first embodiment of the near field optical probe according to the present invention shown in FIG. 1.

First, as shown in FIG. 2A, the second-conductive-type impurity-introduced region 30 is formed on the surface of the first-conductive-type low-concentration layer 20 of the semiconductor substrate having the first-conductive-type high-concentration impurity layer 10 and the first-conductive-type low-concentration impurity layer 20. Then, the through hole 40, which passes through the first-conductive-type high-concentration impurity layer 10 and the first-conductive-type low-concentration impurity layer 20, is provided from the side of the first-conductive-type high-concentration impurity layer 10, through anisotropic etching using alkaline etchant such as sodium hydroxide, hydraizine or the like.

When the etching continues after that, the through hole 40 passes through the second-conductive-type impurity-introduced region 30, and, thereby, the aperture is formed on the surface of the second-conductive-type impurity-introduced region 30.

However, when the etching stops in the second-conductive-type impurity-introduced region 30, as shown in FIG. 2B, the conductive-type of which is different from that of the layers 10 and 20, due to a combination of conditions such as the concentration of the impurity, the composition of the etchant, the ambient temperature, and so forth, the aperture 50 is then formed as a result of the remaining second-conductive-type impurity-introduced region 30 being passed through, through fine working using a converging ion beam, as shown in FIG. 2C, or as a result of the remaining second-conductive-type impurity-introduced region 30 being passed through, through isotropic wet or dry etching, as shown in FIGS. 3A–3B. In the latter case shown in FIGS. 3A–3B, the etching is switched to the isotropic wet or dry etching after the etching stops in the second-conductive-type impurity-introduced region 30, as shown in FIG. 2B.

Figure 4A:
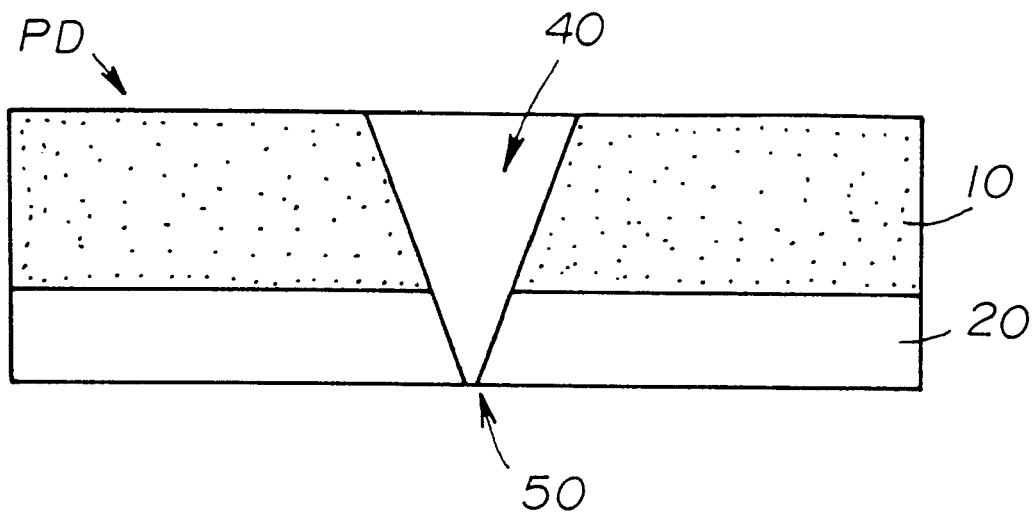
FIGS. 4A–4B show a third embodiment of a method for manufacturing the near field optical probe according to the present invention and illustrate another process of manufacturing the first embodiment of the near field optical probe according to the present invention shown in FIG. 1.
Figure 4B:
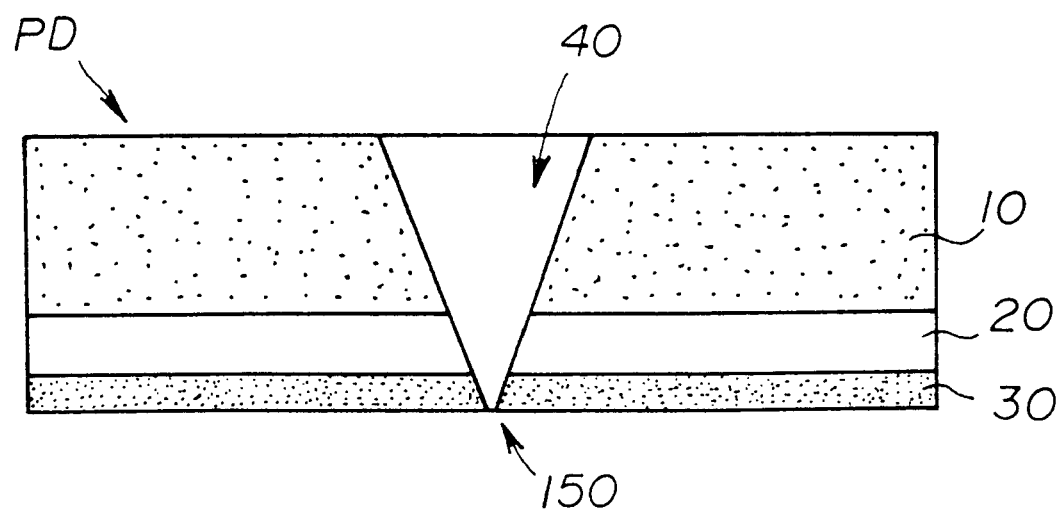

FIGS. 4A–4B show a third embodiment of a method for manufacturing the near field optical probe according to the present invention and illustrate another process of manufacturing the first embodiment of the near field optical probe according to the present invention shown in FIG. 1.

First, as shown in FIG. 4A, the through hole 40, which passes through the first-conductive-type high-concentration impurity layer 10 and the first-conductive-type low-concentration impurity layer 20, is provided from the side of the first-conductive-type high-concentration impurity layer 10 of the semiconductor substrate having the first-conductive-type high-concentration impurity layer 10 and the first-conductive-type low-concentration impurity layer 20.

Then, as shown in FIG. 4B, the second-conductive-type impurity-introduced region 30 is formed in the surface of the first-conductive-type low-concentration impurity layer 20.

Thus, the problem that the etching stops at the boundary at which the conductivity type changes which occurs in the processes shown in FIGS. 2B–2C, 3A–3B can be avoided.

In each of the processes shown in FIGS. 2A–2C, 3A–3B and 4A–4B, the anisotropic etching can be easily performed when the first conductive type is the n type and the second conductive type is the p type.

Further, it is not necessary that the second-conductive-type impurity-introduced region 30 be formed through the entire surface of the first-conductive-type low-concentration impurity layer 20. As the second embodiment of the near field optical probe according to the present invention shown in FIG. 5, it is sufficient that the second-conductive-type impurity-introduced region 30 is formed around the aperture 50.

Thus, the basic arrangements of the near field optical probes and the manufacturing methods thereof have been described making reference to FIGS. 1–5. In the near field optical probe having each of the arrangements shown in FIGS. 1 and 5, at least, the through hole 40 having the aperture 50 is provided in the semiconductor photodetector (photodiode: PD) including the first-conductive-type high-concentration impurity layer 10, first-conductive-type low-concentration impurity layer-20 and second-conductive-type impurity-introduced region 30. Therefore, by integration of the aperture for generating the optical near field and the semiconductor photodetector, which integration has been proposed in the related art, it is possible to miniaturize the near field optical probe and to remarkably improve the efficiency in detection of diffused light and so forth generated through the optical near field.

However, in a near field optical probe having such an arrangement, when a reverse-bias voltage is applied for an operation of the semiconductor photodetector (PD), increase of a dark current mainly through the surface of the through hole 40 in the first-conductive-type low-concentration impurity layer 20 from the second-conductive-type impurity-introduced region 30 to the first-conductive-type high-concentration impurity layer 10, or, in a remarkable case, along-surface leakage occurs. Thereby, achievement of a high-sensitivity light detection may be difficult and/or the normal operation of the light-receiving device may not be performed.

Thus, arrangements of near field optical probes which solve the above-mentioned problem and can perform a light-detection operation stably with high sensitivity while generating the optical near field from an aperture, and manufacturing methods thereof, will now be described.

Figure 6:
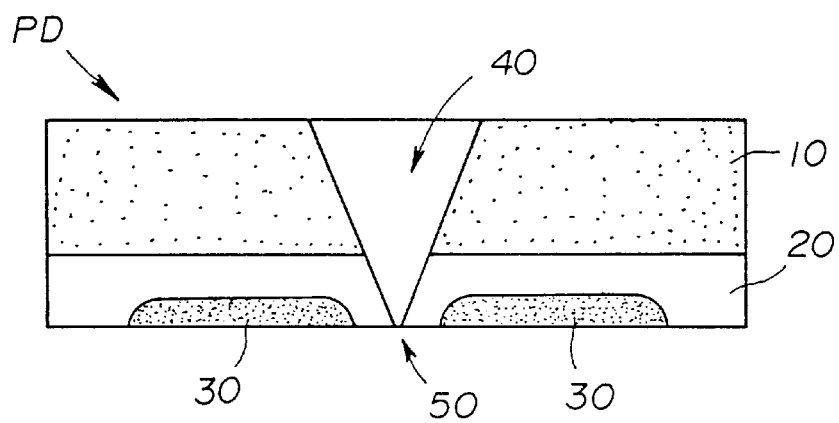
FIG. 6 shows a general essential-portion sectional view of a third embodiment of a near field optical probe according to the present invention.

FIG. 6 shows a general essential-portion sectional view of the third embodiment of the near field optical probe according to the present invention. This near field optical probe has an arrangement in which a through hole 40 having an aperture 50 is provided in a semiconductor photodetector including a first-conductive-type high-concentration impurity layer 10, a first-conductive-type low-concentration impurity layer 20 and a second-conductive-type impurity-introduced region 30, such as that described above. However, the second-conductive-type impurity-introduced region 30 is provided separately from the aperture 50.

Figure 5:
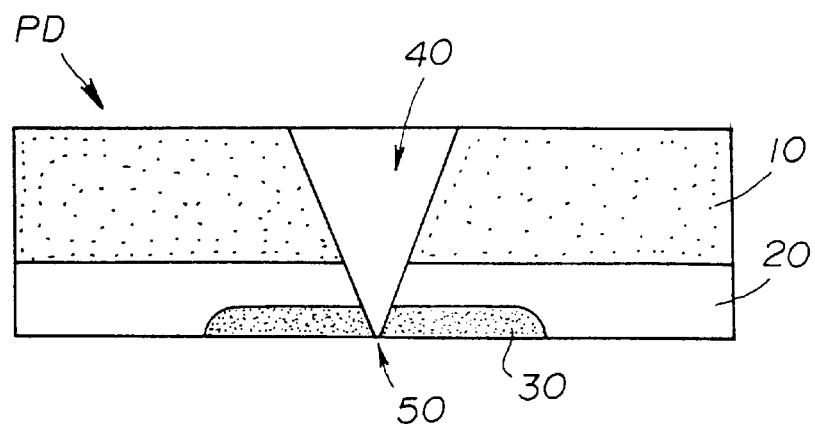
FIG. 5 shows a general essential-portion sectional view of a second embodiment of a near field optical probe according to the present invention.

Thereby, a path of an electric current which directly connects the second-conductive-type impurity-introduced region 30 to the surface of the through hole 40, which path exists in the arrangement shown in each of FIGS. 1 and 5, does not exist. Thereby, it is possible to achieve a stable operation of the semiconductor photodetector (PD).

As a result of determining the distance of separation between the second-conductive-type impurity-introduced region 30 and the aperture 50 to be equal to or more than the distance of a depletion layer which spreads on the surface of the first-conductive-type low-concentration impurity layer 20 when a reverse-bias voltage necessary for the operation of the PD is applied, for example, it is possible to increase the advantage of the third embodiment of the near field optical probe according to the present invention.

Figure 7:
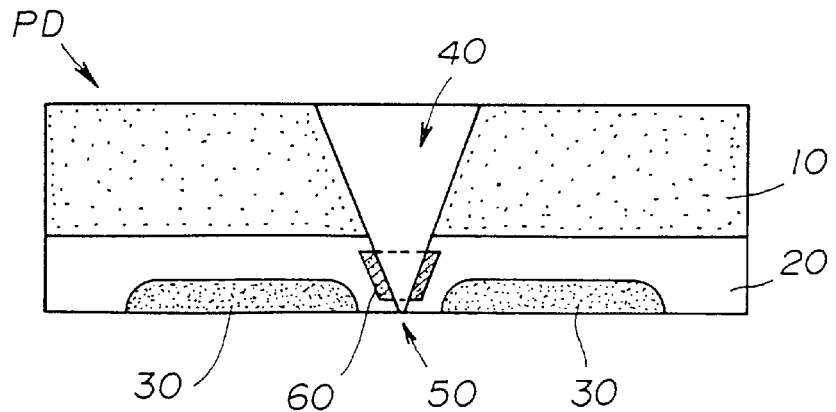
FIG. 7 shows a general-essential-portion sectional view of a fourth embodiment of a near field optical probe according to the present invention.

FIG. 7 shows a general essential-portion sectional view of the fourth embodiment of the near field optical probe according to the present invention. In this near field optical probe, in addition to the same arrangement as that of the near field optical probe shown in FIG. 6, a ring-shaped first-conductive-type high-concentration impurity region 60, provided along the direction of a through hole 40, is formed so as to surround the through hole 40 in a first-conductive-type low-concentration impurity layer 20. The first-conductivetype high-concentration impurity region 60 may be formed as a result of a phosphorus, boron or another dopant, depending on the conductivity type, which is used commonly, being diffused. This first-conductive-type high-concentration impurity region 60 functions as a preventing layer such that, although a depletion layer, which spreads from the second-conductive-type impurity-introduced region 30 in a direction along the surface of the through hole 40, grows when a reverse-bias voltage or zero-bias voltage is applied, the growth stops within a slight length.

Thereby, it is possible to control occurrence or increase of a surface leakage current due to development of a channel along the through hole 40.

The fourth embodiment of the near field optical probe according to the present invention is an example obtained as a result of a near field optical probe having an arrangement such as that shown in FIG. 6 being modified. However, it is also possible that a near field optical probe having an arrangement such as that shown in each of FIGS. 1 and 5 is modified in the same manner.

Figure 8:
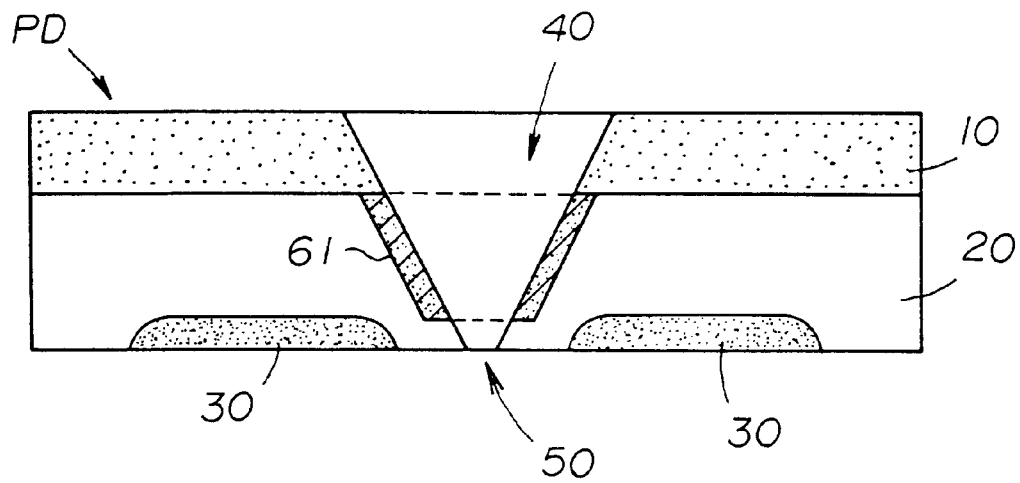
FIG. 8 shows a general essential-portion sectional view of a fifth embodiment of a near field optical probe according to the present invention.

FIG. 8 shows a general essential-portion sectional view of the fifth embodiment of the near field optical probe according to the present invention. In this near field optical probe, a high-concentration impurity region 61, similar to the ring-shaped first-conductive-type high-concentration impurity region 60 in the arrangement of the fourth embodiment of the near field optical probe according to the present invention shown in FIG. 7, is provided in a manner such that the high-concentration impurity region 61 is connected to a first-conductive-type high-concentration impurity layer 10, as shown in FIG. 8. Thereby, the ring-shaped first-conductive-type high-concentration impurity region 61 has not only the above-described function of preventing growth of the channel, but also a function of a substrate-side high-concentration impurity layer of a so-called PIN-type PD. Thus, it is possible to optoelectrically transduce light received in the proximity of an aperture 50 so as to effectively draw the light as an electric current. That is, it is possible to increase the efficiency of light detection in the proximity of the aperture 50.

However, the arrangement of the fifth embodiment of the near field optical probe according to the present invention is further effective in a case where the distance between the second-conductive-type impurity-introduced region 30 and the first-conductive-type high-concentration impurity region 61 can be determined to be relatively large, and is designed to have dimensions such that, when a reverse-bias voltage is applied, the electric field between both regions does not become excessively high in comparison to the other portion.

Figure 9:
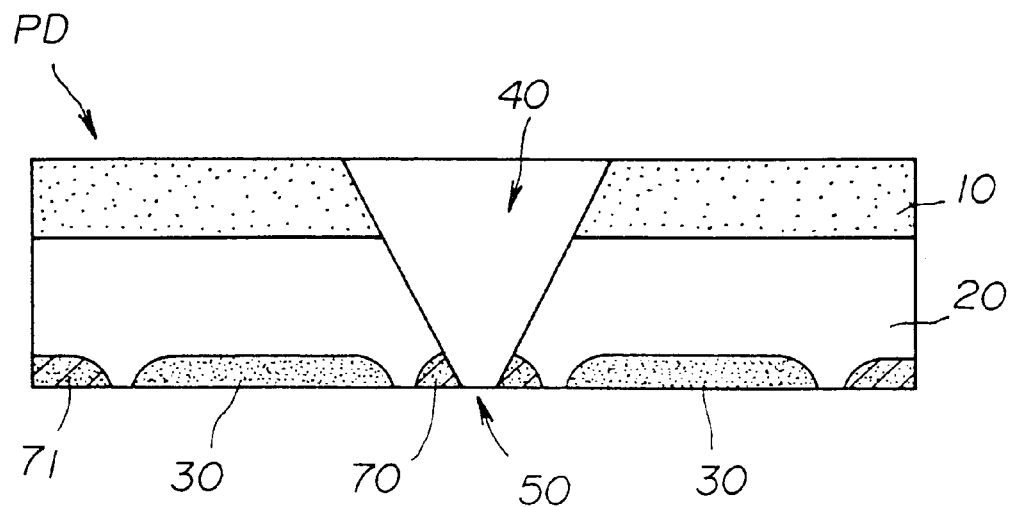
FIG. 9 shows a general essential-portion sectional view of a sixth embodiment of a near field optical probe according to the present invention.

FIG. 9 shows a general essential-portion sectional view of the sixth embodiment of the near field optical probe according to the present invention. In this near field optical probe, in addition to an arrangement the same as that of the near field optical probe shown in FIG. 6, a first-conductive-type high-concentration impurity-introduced region 70 is provided. The first-conductive-type high-concentration impurity-introduced region 70 is provided at a portion spreading from and in the proximity of the surface of the first-conductive-type low-concentration impurity layer 20, has a plane shape containing an aperture 50 and separate from the second-conductive-type impurity-introduced region 30.

The first-conductive-type high-concentration impurity-introduced region 70 can be formed in a common semiconductor process similar to that in which the second-conductivity-type impurity-introduced region 30 is formed, from the surface of the first-conductive-type low-concentration impurity layer 20 (from the bottom thereof, in the figure), in an arbitrary plane shape. It is preferable that the first-conductive-type high-concentration impurity-introduced region 70 has a shape such that the first-conductive-type high-concentration impurity-introduced region 70 is a fixed distance from the second-conductive-type impurity-introduced region 30 and surrounds the aperture 50. Further, it is also possible to form a first-conductive-type high-concentration impurity-introduced region 71, which is not connected to and surrounds the second-conductive-type impurity-introduced region 30.

Thereby, it is possible to prevent a channel from spreading along the surface of the near field optical probe from the second-conductive-type impurity-introduced region 30.

Figure 10:
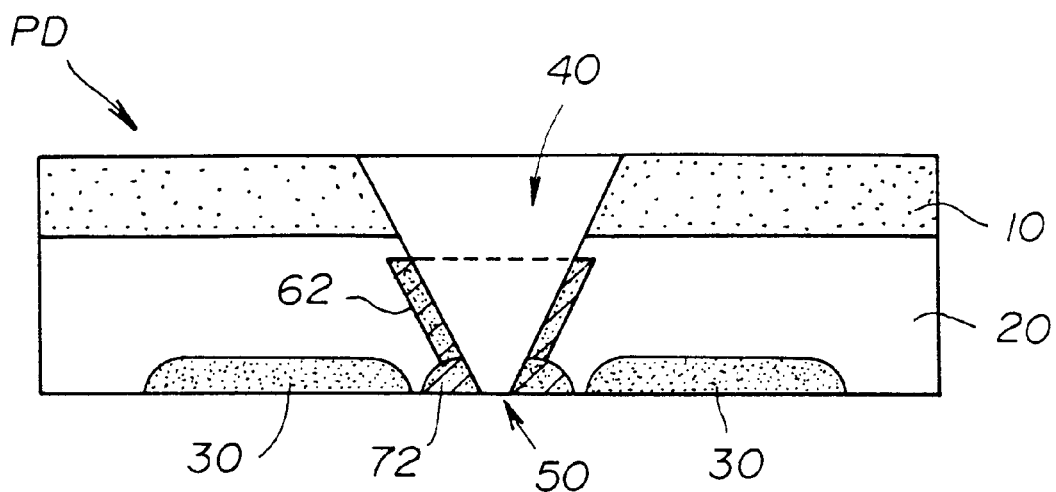
FIG. 10 shows a general essential-portion sectional view of a seventh embodiment of a near field optical probe according to the present invention.

FIG. 10 shows a general essential-portion sectional view of the seventh embodiment of the near field optical probe according to the present invention. In this near field optical probe, in addition to an arrangement similar to that of the near field optical probe shown in FIG. 9, a ring-shaped first-conductive-type high-concentration impurity region 62 along a through hole 40 is formed so as to surround the through hole 40 in the first-conductive-type low-concentration impurity layer 20, and, also, the ring-shaped first-conductive-type high-concentration impurity region 62 is connected to a first-conductive-type high-concentration impurity-introduced region 72 having a plane shape containing an aperture 50 and separated from a second-conductive-type impurity-introduced region 30.

Thereby, it is possible to prevent a channel from spreading from the second-conductive-type impurity-introduced region 30 along the surface of the near field optical probe, and, then, the surface of the through hole 40. Thus, it is possible to positively achieve decrease of a leakage current.

Further, it is possible to provide the ring-shaped first-conductive-type high-concentration impurity region 62 in a manner such that the ring-shaped first-conductive-type high-concentration impurity region 62 is also connected to a first-conductive-type high-concentration impurity layer 10. However, this arrangement is further effective in a case where the distances between the second-conductive-type impurity-introduced region 30 and the aperture 50 and between the second-conductive-type impurity-introduced region 30 and the first-conductive-type high-concentration impurity region 62 can be determined to be relatively large, and is designed to be a dimension such that, when a reverse-bias voltage is applied, the electric field between both regions does not become excessively high in comparison to the other portion.

Figure 11:
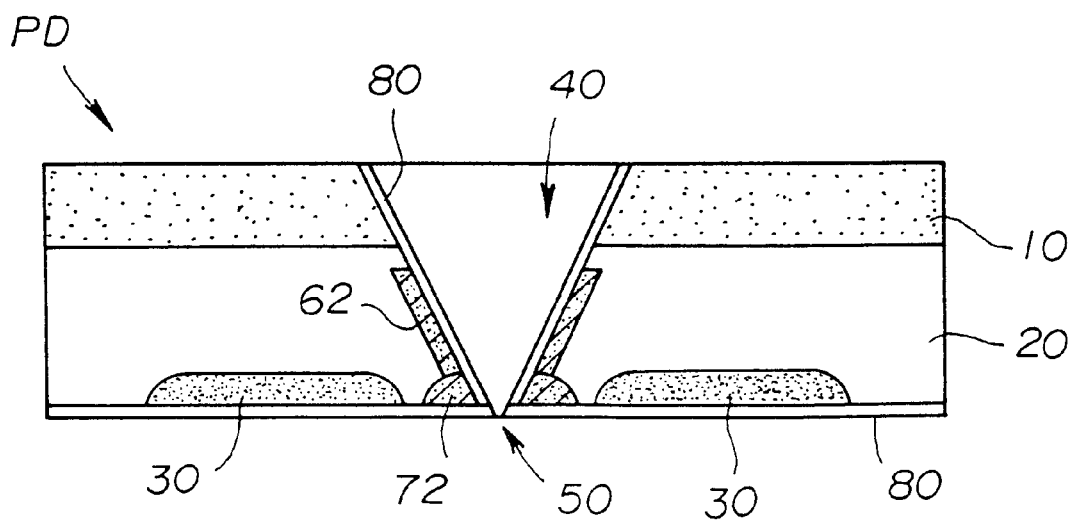
FIG. 11 shows a general essential-portion sectional view of an eighth embodiment of a near field optical probe according to the present invention.

FIG. 11 shows a general essential-portion sectional view of the eighth embodiment of the near field optical probe according to the present invention. In this near field optical probe, in addition to an arrangement the same as that of the near field optical probe shown in FIG. 10, a dielectric film 80 is provided on the surface of a through hole 40. As the dielectric film 80, silicon oxide, silicon nitride or the like used in the semiconductor process can be used. When the semiconductor is silicon, an oxide film formed through thermal oxidation of the silicon is the most suitable.

This dielectric film 80 functions as a protective film for the surface of the semiconductor surface, and can prevent leakage in the PD due to defects, impurities or the like in interfaces. Further, in a later-described case where a metal film is laminated and in a case where electric conduction between the semiconductor and the metal film is prevented, the dielectric film 80 functions as an insulative film.

Thereby, it is possible to prevent operation failure of the photodetector due to time-elapse deterioration or leakage, and to prevent a short circuit due to the lamination of the metal film.

This dielectric film 80 may be formed on a portion, other than the surface of the through hole 40, such as the light-receiving surface of the photodetector and/or the like.

Further, although FIG. 11 shows the arrangement in which the dielectric film 80 is formed on the surface of the through hole 40 of the near field optical probe shown in FIG. 10, it is also possible that a dielectric film is formed on the surface of the through hole 40 of the near field optical probe having the arrangement shown in any of FIGS. 6–9.

A fourth embodiment of a method for manufacturing the near field optical probe according to the present invention will now be described. When any of the above-described fourth, fifth, seventh and eighth embodiments of the near field optical probes according to the present invention is formed, at the time of forming the ring-shaped first-conductive-type high-concentration impurity region (60, 61, 62) along the surface of the through hole 40, impurity diffusion using an impurity in a gas phase (gas phase diffusion or gas-to-solid diffusion) is used. The reason thereof will now be described.

FIGS. 12A–12D show a problematic example at a time of manufacturing the near field optical probe.

Figure 12A:
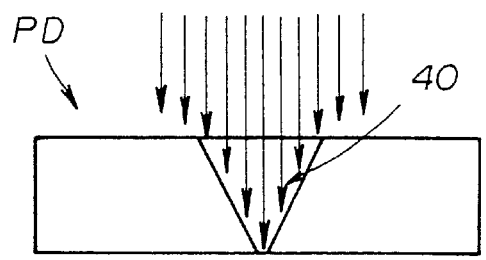
FIGS. 12A–12D show a problematic example at a time of manufacturing a near field optical probe.
Figure 12B:
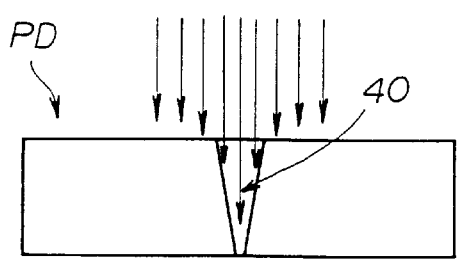
Figure 12C:
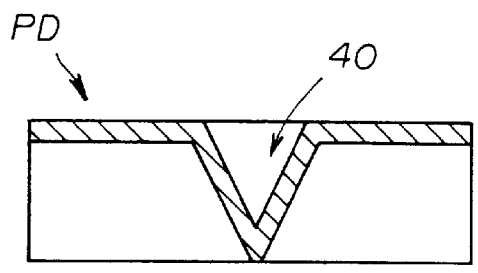
Figure 12D:
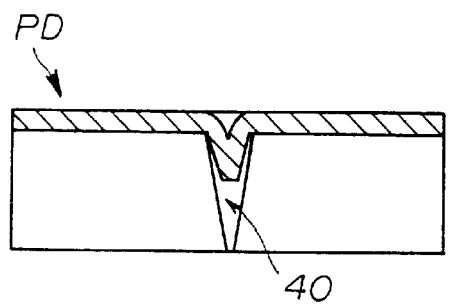

When the ring-shaped first-conductive-type high-concentration impurity region (60, 61, 62) along the surface of the through hole 40 is formed in the fourth, fifth, seventh or eighth embodiment of the near field optical probe according to the present invention, in a case where the sectional shape of the through hole 40 has a relatively gentle taper shape as shown in FIGS. 12A and 12C, it is possible to cause impurity diffusion to be performed through ion implantation used in a common semiconductor process or to cause impurity diffusion through solid-to-solid diffusion from a layer including dopant and formed through the spinning-on method, CVD method or PVD method. However, when the sectional shape of the through hole 40 is a vertical shape or a relatively steep taper shape as shown in FIGS. 12B and 12D, it is difficult to form an impurity-diffused region having a shape surrounding the through hole 40.

In such a case, by using the impurity diffusion using an impurity in a gas phase, it is possible to form the ring-shaped first-conductive-type high-concentration impurity region in a through hole having a sectional shape which is a vertical shape or a relatively steep taper shape. In this case, a reaction between the impurity in the gas phase and the substrate is used at the time of predeposition prior to drive-in. The impurity source itself may be in any in a gas phase, a liquid phase and a solid phase.

Other steps of the fourth embodiment of the method for manufacturing the near field optical probe according to the present invention may be the same as those in any of the above-described first, second and third embodiments of the method for manufacturing the near field optical probe according to the present invention.

Figure 13:
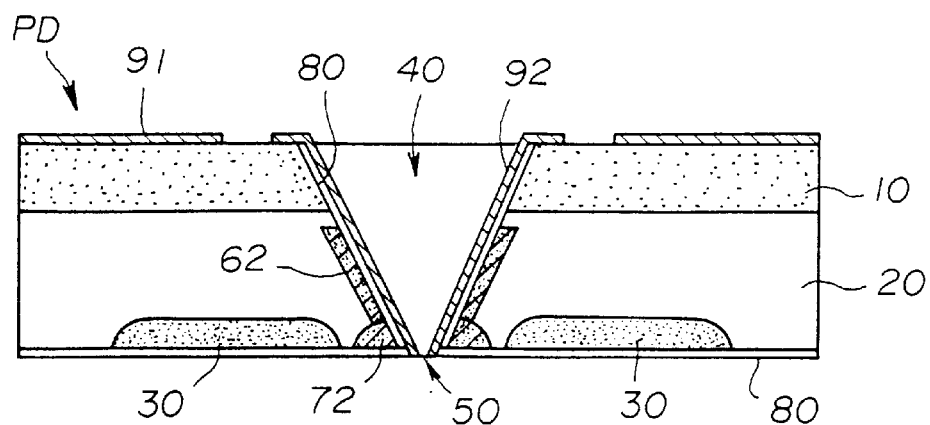
FIG. 13 shows a general essential-portion sectional view of a ninth embodiment of a near field optical probe according to the present invention.

FIG. 13 shows a general essential-portion sectional view of the ninth embodiment of the near field optical probe according to the present invention. In this near field optical probe, in addition to an arrangement the same as that of the near field optical probe shown in FIG. 11, metal films 92 and 91 are provided on the surface of the through hole 40 and the surface of the first-conductive-type high-concentration impurity layer 10, respectively. Other than this example, it is also possible to form metal films on the surface of the through hole 40 and the surface of the first-conductive-type high-concentration impurity layer 10, respectively, of the near field optical probe having any of the arrangements shown in FIGS. 6–10.

In each of the third through eighth embodiments of the near field optical probes according to the present invention, it is possible to form the metal film 92 on the through hole 40, as shown in FIG. 13, for a purpose of shading when light is incident on the through hole 40 for generating the optical near field, due to a relationship between the wavelength of the light and the transmissivity of the substrate material, for necessity from the optical near field generation principle, or for a purpose of reflection for increasing the optical near field.

Further, lamination of the metal film 91, which acts as a conductive path to a circuit for light detection and so forth, is necessary for the PD which is the photodetector.

A fifth embodiment of a method for manufacturing the near field optical probe according to the present invention will now be described.

When a near field optical probe having an arrangement such as that of the ninth embodiment of the near field optical probe according to the present invention is formed, at the time of providing metal films on the surface of a through hole and the surface of a first-conductive-type high-concentration impurity layer, it is preferable that the metal film 92 on the surface of the though hole and the metal film 91 on the surface of the first-conductive-type high-concentration impurity layer are formed at the same time.

That is, although it is possible to form these metal films 91 and 92 on the surface of the through hole and the surface of the first-conductive-type high-concentration impurity layer, respectively, in separate processes, using different materials due to necessity, it is possible to omit a process and increase the manufacturing efficiency when these metal films 91 and 92 are formed at the same time using metal, such as aluminum (Al), gold (Au), chromium (Cr), for example, which can be used for both the metal films 91 and 92 in common.

At this time, in the case of the arrangement in which the ring-shaped first-conductive-type high-concentration impurity region 61 or 62 is provided in the manner such that the ring-shaped first-conductive-type high-concentration impurity region 61 or 62 is connected to the first-conductive-type high-concentration impurity layer 10, such as the arrangement of the fifth embodiment of the near field optical probe according to the present invention shown in FIG. 8 or the arrangement of the variation of the seventh embodiment of the near field optical probe according to the present invention, it is preferable that the above-mentioned metal films 91 and 92 be formed continuously and be electrically connected with one another, and, also, the dielectric film 80, which is the component of the eighth embodiment of the near field optical probe according to the present invention, not be provided at portions of the area through which the metal film 92 is formed, at which portions the metal film 92 is laminated on the first-conductive-type high-concentration impurity region 10 and the ring-shaped first-conductive-type high-concentration impurity region 61 or 62.

In a case of an arrangement other than the above-mentioned arrangements, it is preferable that the dielectric film 80 be formed at the portion of the through hole 40 (the arrangement of the eighth embodiment of the near field optical probe according to the present invention), and, further, thereon, as shown in FIG. 13, the metal film 92 be formed. In the case where the near field optical probe has the above-described arrangement, continuity with the metal film 91 laminated on the first-conductive-type high-concentration impurity layer 10 does not matter. In order to further positively ensure the insulation, it is possible to rather make the metal films 91 and 92 discontinuous, and to cut off electrical connection therebetween.

Further, it is possible to connect a conductive path, not shown in the figure, extending further externally, to the metal film 91 laminated on the first-conductive-type high-concentration impurity region 10.

Other steps of the fifth embodiment of the method for manufacturing the near field optical probe according to the present invention may be the same as those in any of the above-described first, second, third and fourth embodiments of the method for manufacturing the near field optical probe according to the present invention.

Figure 14:
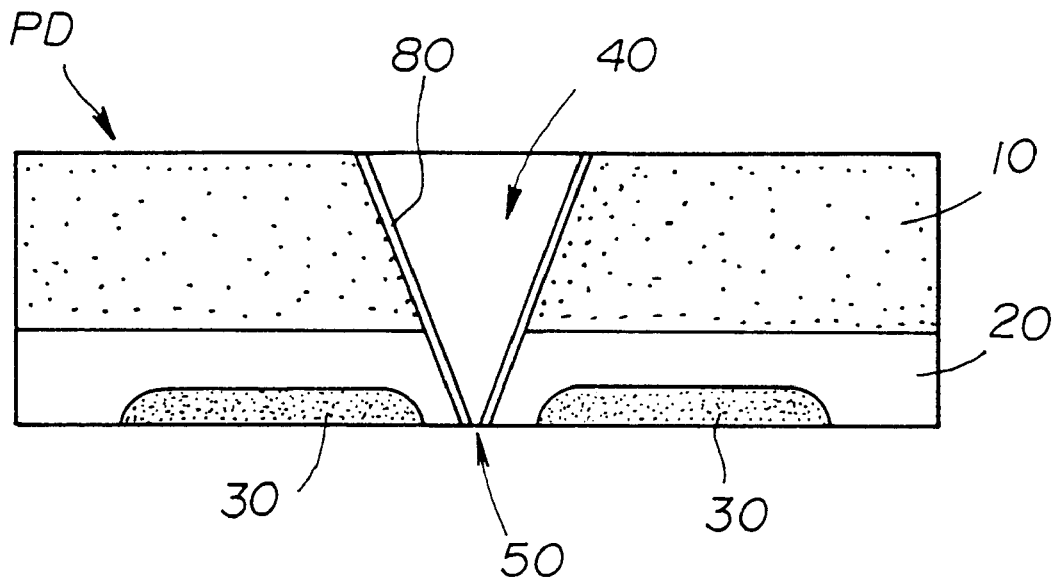
FIG. 14 shows a general essential-portion sectional view of a variant embodiment of the third embodiment of the near field optical probe according to the present invention.

FIG. 14 shows a general essential-portion sectional view of a variant embodiment of the third embodiment of the near field optical probe according to the present invention shown in FIG. 6. This variant embodiment is obtained as a result of a dielectric film 80 being provided on the surface of the through hole 40 in the third embodiment of the near field optical probe according to the present invention, as in the eighth embodiment of the near field optical probe according to the present invention shown in FIG. 11.

Figure 15:
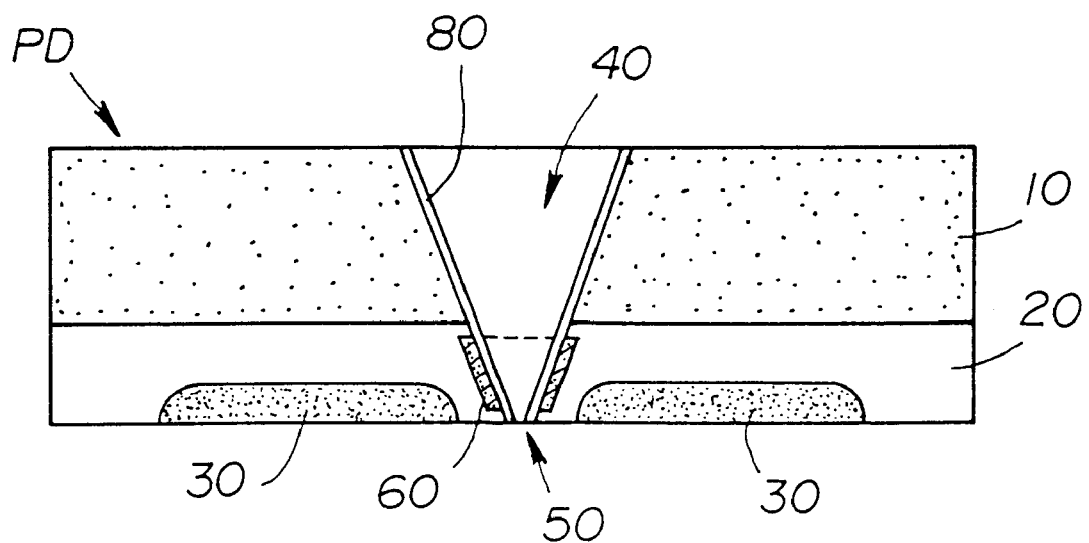
FIG. 15 shows a general essential-portion sectional view of a variant embodiment of the fourth embodiment of the near field optical probe according to the present invention.

FIG. 15 shows a general essential-portion sectional view of a variant embodiment of the fourth embodiment of the near field optical probe according to the present invention shown in FIG. 7. This variant embodiment is obtained as a result of a dielectric film 80 being provided on the surface of the through hole 40 in the fourth embodiment of the near field optical probe according to the present invention, as in the eighth embodiment of the near field optical probe according to the present invention shown in FIG. 11. When manufacturing this variant embodiment, it is possible to use the above-described fourth embodiment (use of impurity diffusion using the impurity in a gas phase) of the method for manufacturing the near field optical probe according to the present invention at the time of forming a ring-shaped first-conductive-type high-concentration impurity region 60.

Figure 16:
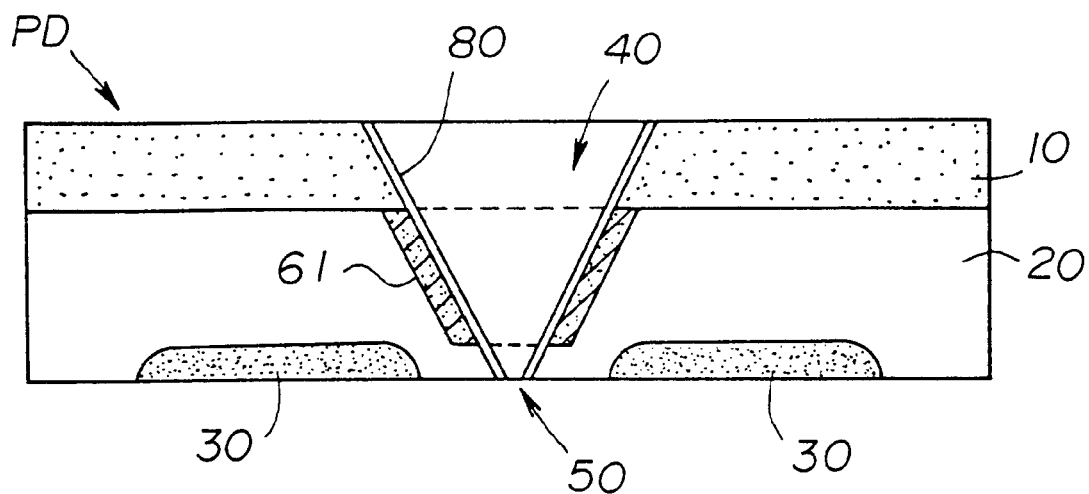
FIG. 16 shows a general essential-portion sectional view of a variant embodiment of the fifth embodiment of the near field optical probe according to the present invention.

FIG. 16 shows a general essential-portion sectional view of a variant embodiment of the fifth embodiment of the near field optical probe according to the present invention shown in FIG. 8. This variant embodiment is obtained as a result of a dielectric film 80 being provided on the surface of the through hole 40 in the fifth embodiment of the near field optical probe according to the present invention, as in the eighth embodiment of the near field optical probe according to the present invention shown in FIG. 11. When manufacturing this variant embodiment, it is possible to use the above-described fourth embodiment (use of impurity diffusion using the impurity in a gas phase) of the method for manufacturing the near field optical probe according to the present invention at the time of forming a ring-shaped first-conductive-type high-concentration impurity region 61.

Figure 17:
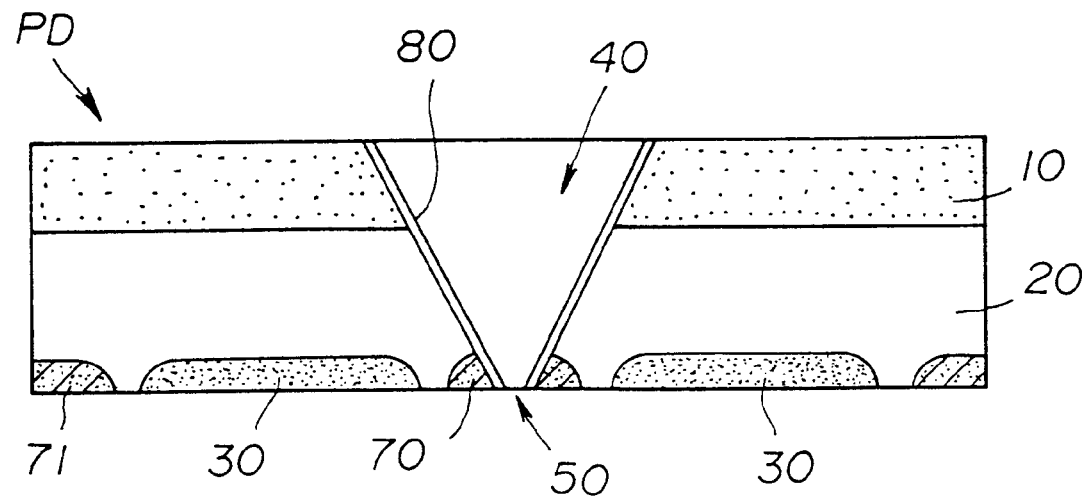
FIG. 17 shows a general essential-portion sectional view of a variant embodiment of the sixth embodiment of the near field optical probe according to the present invention.

FIG. 17 shows a general essential-portion sectional view of a variant embodiment of the sixth embodiment of the near field optical probe according to the present invention shown in FIG. 9. This variant embodiment is obtained as a result of a dielectric film 80 being provided on the surface of the through hole 40 in the sixth embodiment of the near field optical probe according to the present invention, as in the eighth embodiment of the near field optical probe according to the present invention shown in FIG. 11.

Figure 18:
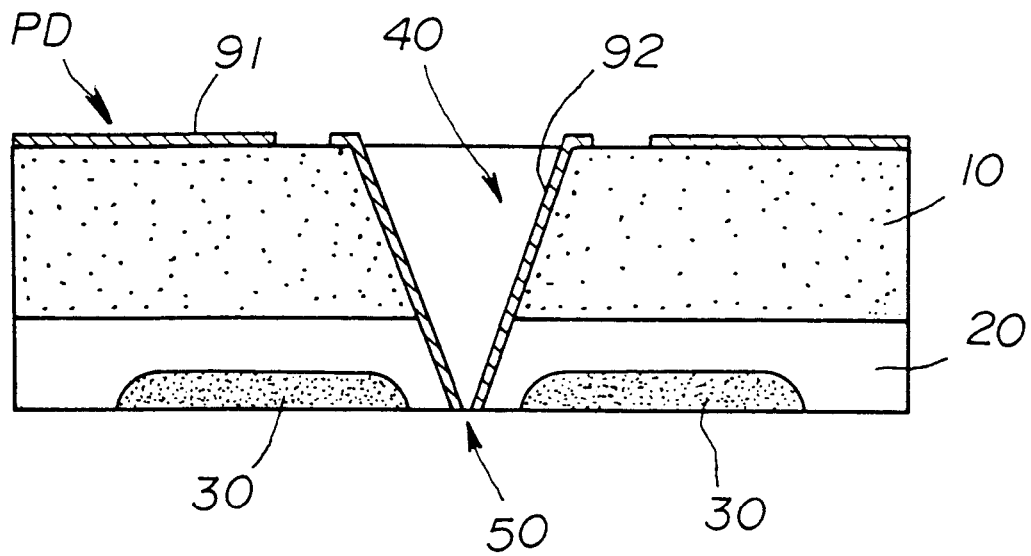
FIG. 18 shows a general essential-portion sectional view of another variant embodiment of the third embodiment of the near field optical probe according to the present invention.

FIG. 18 shows a general essential-portion sectional view of another variant embodiment of the third embodiment of the near field optical probe according to the present invention shown in FIG. 6. This variant embodiment is obtained as a result of metal films 91 and 92 being provided on the surface of the first-conductive-type high-concentration impurity layer 10 and the surface of the through hole 40, respectively, in the third embodiment of the near field optical probe according to the present invention, as in the ninth embodiment of the near field optical probe according to the present invention shown in FIG. 13. When manufacturing this variant embodiment, it is possible to use the above-described fifth embodiment (simultaneous formation of the metal films 91 and 92) of the method for manufacturing the near field optical probe according to the present invention, at the time of forming the metal films 91 and 92.

Figure 19:
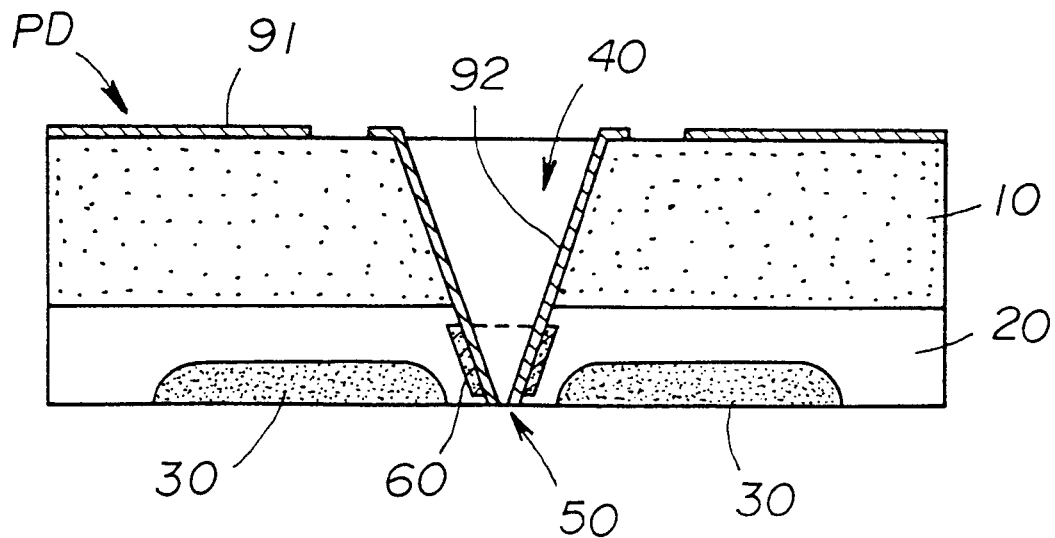
FIG. 19 shows a general essential-portion sectional view of another variant embodiment of the fourth embodiment of the near field optical probe according to the present invention.

FIG. 19 shows a general essential-portion sectional view of another variant embodiment of the fourth embodiment of the near field optical probe according to the present invention shown in FIG. 7. This variant embodiment is obtained as a result of metal films 91 and 92 being provided on the surface of the first-conductive-type high-concentration impurity layer 10 and the surface of the through hole 40, respectively, in the fourth embodiment of the near field optical probe according to the present invention, as in the ninth embodiment of the near field optical probe according to the present invention shown in FIG. 13. When manufacturing this variant embodiment, it is possible to use the above-described fourth embodiment (use of impurity diffusion using the impurity in the gas phase) of the method for manufacturing the near field optical probe according to the present invention at the time of forming a ring-shaped first-conductive-type high-concentration impurity region 60. Further, when manufacturing this variant embodiment, it is also possible to use the above-described fifth embodiment (simultaneous formation of the metal films 91 and 92) of the method for manufacturing the near field optical probe according to the present invention, at the time of forming the metal films 91 and 92.

Figure 20:
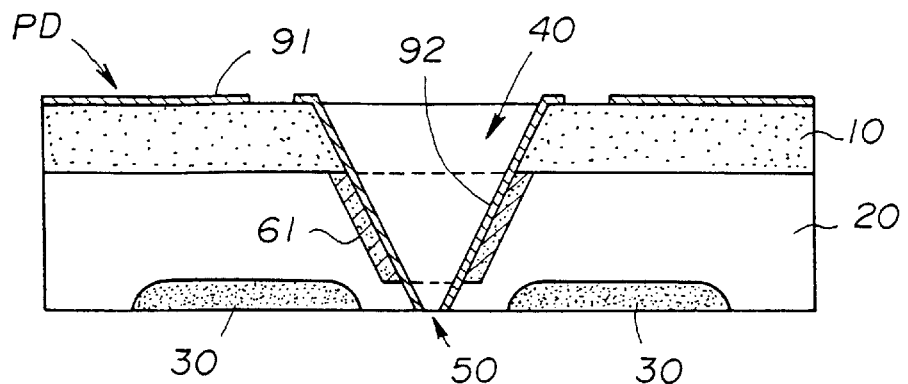
FIG. 20 shows a general essential-portion sectional view of another variant embodiment of the fifth embodiment of the near field optical probe according to the present invention.

FIG. 20 shows a general essential-portion sectional view of another variant embodiment of the fifth embodiment of the near field optical probe according to the present invention shown in FIG. 8. This variant embodiment is obtained as a result of metal films 91 and 92 being provided on the surface of the first-conductive-type high-concentration impurity layer 10 and the surface of the through hole 40, respectively, in the fifth embodiment of the near field optical probe according to the present invention, as in the ninth embodiment of the near field optical probe according to the present invention shown in FIG. 13. When manufacturing this variant embodiment, it is possible to use the above-described fourth embodiment (use of impurity diffusion using the impurity in the gas phase) of the method for manufacturing the near field optical probe according to the present invention at the time of forming a ring-shaped first-conductive-type high-concentration impurity region 61. Further, when manufacturing this variant embodiment, it is also possible to use the above-described fifth embodiment (simultaneous formation of the metal films 91 and 92) of the method for manufacturing the near field optical probe according to the present invention, at the time of forming the metal films 91 and 92.

Figure 21:
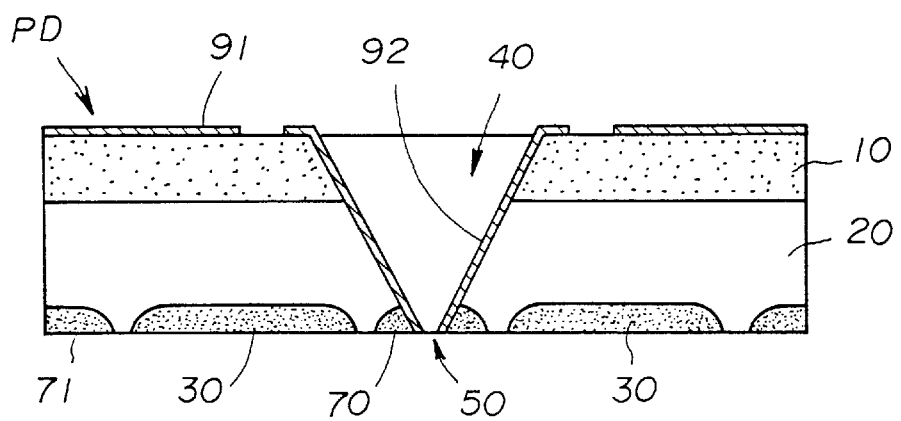
FIG. 21 shows a general essential-portion sectional view of another variant embodiment of the sixth embodiment of the near field optical probe according to the present invention.

FIG. 21 shows a general essential-portion sectional view of another variant embodiment of the sixth embodiment of the near field optical probe according to the present invention shown in FIG. 9. This variant embodiment is obtained as a result of metal films 91 and 92 being provided on the surface of the first-conductive-type high-concentration impurity layer 10 and the surface of the through hole 40, respectively, in the sixth embodiment of the near field optical probe according to the present invention, as in the ninth embodiment of the near field optical probe according to the present invention shown in FIG. 13. When manufacturing this variant embodiment, it is possible to use the above-described fifth embodiment (simultaneous formation of the metal films 91 and 92) of the method for manufacturing the near field optical probe according to the present invention, at the time of forming the metal films 91 and 92.

Figure 22:
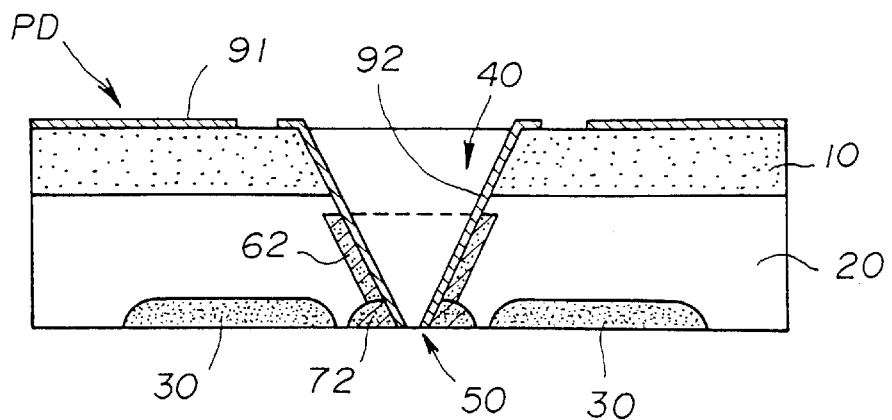
FIG. 22 shows a general essential-portion sectional view of a variant embodiment of the seventh embodiment of the near field optical probe according to the present invention.

FIG. 22 shows a general essential-portion sectional view of a variant embodiment of the seventh embodiment of the near field optical probe according to the present invention shown in FIG. 10. This variant embodiment is obtained as a result of metal films 91 and 92 being provided on the surface of the first-conductive-type high-concentration impurity layer 10 and the surface of the through hole 40, respectively, in the seventh embodiment of the near field optical probe according to the present invention, as in the ninth embodiment of the near field optical probe according to the present invention shown in FIG. 13. When manufacturing this variant embodiment, it is possible to use the above-described fourth embodiment (use of impurity diffusion using the impurity in the gas phase) of the method for manufacturing the near field optical probe according to the present invention at the time of forming a ring-shaped first-conductive-type high-concentration impurity region 62. Further, when manufacturing this variant embodiment, it is also possible to use the above-described fifth embodiment (simultaneous formation of the metal films 91 and 92) of the method for manufacturing the near field optical probe according to the present invention, at the time of forming the metal films 91 and 92.

Figure 23:
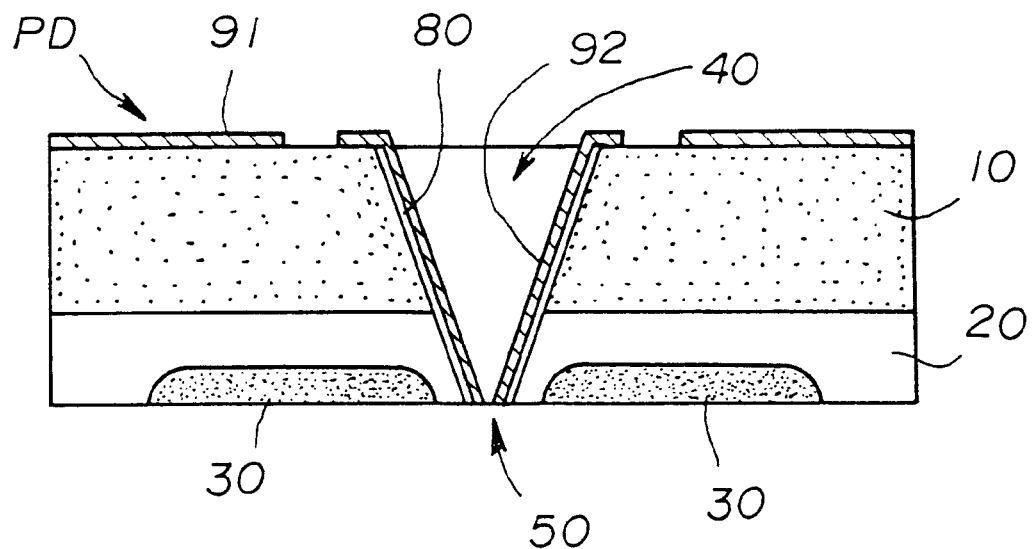
FIG. 23 shows a general essential-portion sectional view of another variant embodiment of the third embodiment of the near field optical probe according to the present invention.

FIG. 23 shows a general essential-portion sectional view of another variant embodiment of the third embodiment of the near field optical probe according to the present invention shown in FIG. 6. This variant embodiment is obtained as a result of a dielectric film 80 being provided on the surface of the through hole 40, and, then, metal films 91 and 92 being provided on the surface of the first-conductive-type high-concentration impurity layer 10 and the surface of the through hole 40 (so as to cover the dielectric film 80), respectively, in the third embodiment of the near field optical probe according to the present invention, as in the ninth embodiment of the near field optical probe according to the present invention shown in FIG. 13. When manufacturing this variant embodiment, it is possible to use the above-described fifth embodiment (simultaneous formation of the metal films 91 and 92) of the method for manufacturing the near field optical probe according to the present invention, at the time of forming the metal films 91 and 92.

Figure 24:
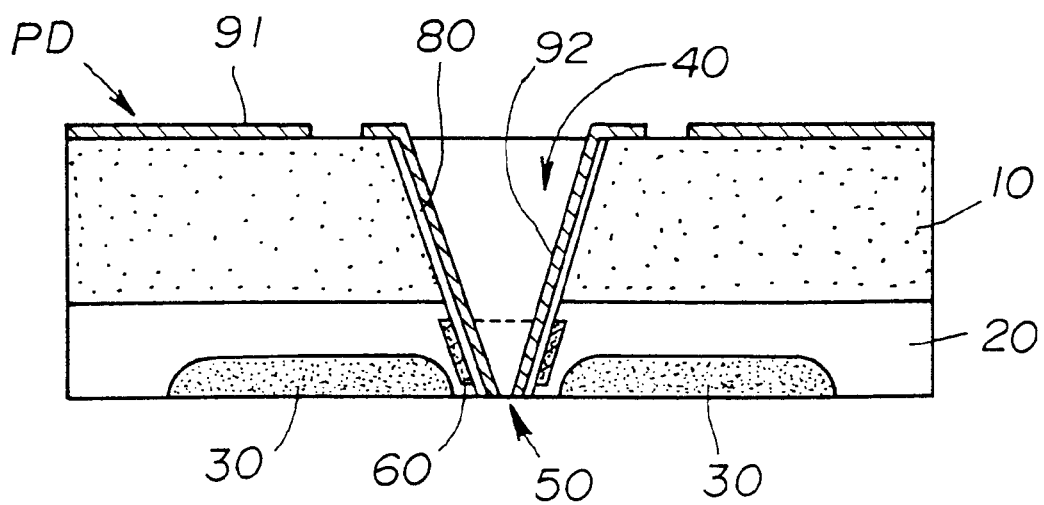
FIG. 24 shows a general essential-portion sectional view of another variant embodiment of the fourth embodiment of the near field optical probe according to the present invention.

FIG. 24 shows a general essential-portion sectional view of another variant embodiment of the fourth embodiment of the near field optical probe according to the present invention shown in FIG. 7. This variant embodiment is obtained as a result of a dielectric film 80 being provided on the surface of the through hole 40, and, then, metal films 91 and 92 being provided on the surface of the first-conductive-type high-concentration impurity layer 10 and the surface of the through hole 40 (so as to cover the dielectric film 80), respectively, in the fourth embodiment of the near field optical probe according to the present invention, as in the ninth embodiment of the near field optical probe according to the present invention shown in FIG. 13. When manufacturing this variant embodiment, it is possible to use the above-described fourth embodiment (use of impurity diffusion using the impurity in the gas phase) of the method for manufacturing the near field optical probe according to the present invention at the time of forming a ring-shaped first-conductive-type high-concentration impurity region 60. Further, when manufacturing this variant embodiment, it is also possible to use the above-described fifth embodiment (simultaneous formation of the metal films 91 and 92) of the method for manufacturing the near field optical probe according to the present invention, at the time of forming the metal films 91 and 92.

Figure 25:
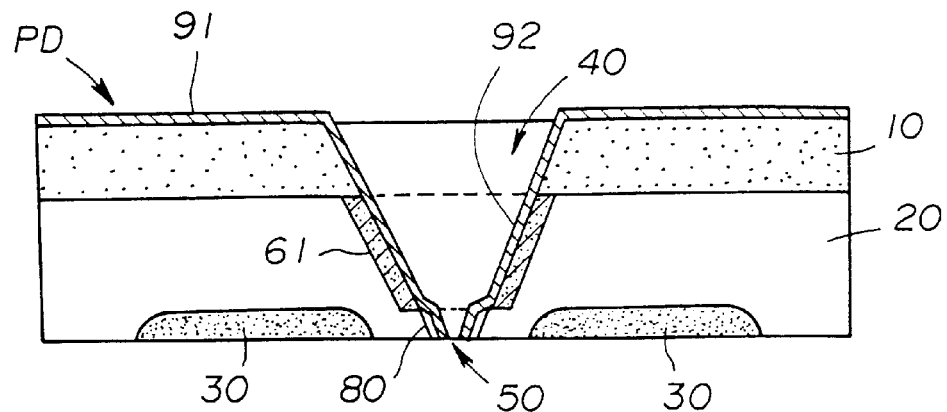
FIG. 25 shows a general essential-portion sectional view of another variant embodiment of the fifth embodiment of the near field optical probe according to the present invention.

FIG. 25 shows a general essential-portion sectional view of another variant embodiment of the fifth embodiment of the near field optical probe according to the present invention shown in FIG. 8. This variant embodiment is obtained as a result of a dielectric film 80 being provided on the surface of the through hole 40, and, then, metal films 91 and 92 being provided on the surface of the first-conductive-type high-concentration impurity layer 10 and the surface of the through hole 40 (so as to cover the dielectric film 80), respectively, in the fifth embodiment of the near field optical probe according to the present invention, as in the ninth embodiment of the near field optical probe according to the present invention shown in FIG. 13. When manufacturing this variant embodiment, it is possible to use the above-described fourth embodiment (use of impurity diffusion using the impurity in the gas phase) of the method for manufacturing the near field optical probe according to the present invention at the time of forming a ring-shaped first-conductive-type high-concentration impurity region 61. Further, when manufacturing this variant embodiment, it is also possible to use the above-described fifth embodiment (simultaneous formation of the metal films 91 and 92) of the method for manufacturing the near field optical probe according to the present invention, at the time of forming the metal films 91 and 92.

Figure 26:
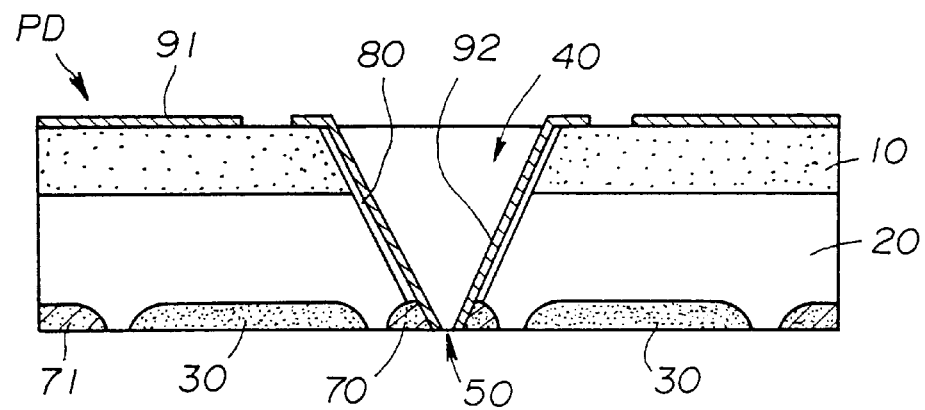
FIG. 26 shows a general essential-portion sectional view of another variant embodiment of the sixth embodiment of the near field optical probe according to the present invention.

FIG. 26 shows a general essential-portion sectional view of another variant embodiment of the sixth embodiment of the near field optical probe according to the present invention shown in FIG. 9. This variant embodiment is obtained as a result of a dielectric film 80 being provided on the surface of the through hole 40, and, then, metal films 91 and 92 being provided on the surface of the first-conductive-type high-concentration impurity layer 10 and the surface of the through hole 40 (so as to cover the dielectric film 80), respectively, in the sixth embodiment of the near field optical probe according to the present invention, as in the ninth embodiment of the near field optical probe according to the present invention shown in FIG. 13. When manufacturing this variant embodiment, it is possible to use the above-described fifth embodiment (simultaneous formation of the metal films 91 and 92) of the method for manufacturing the near field optical probe according to the present invention, at the time of forming the metal films 91 and 92.

Figure 27:
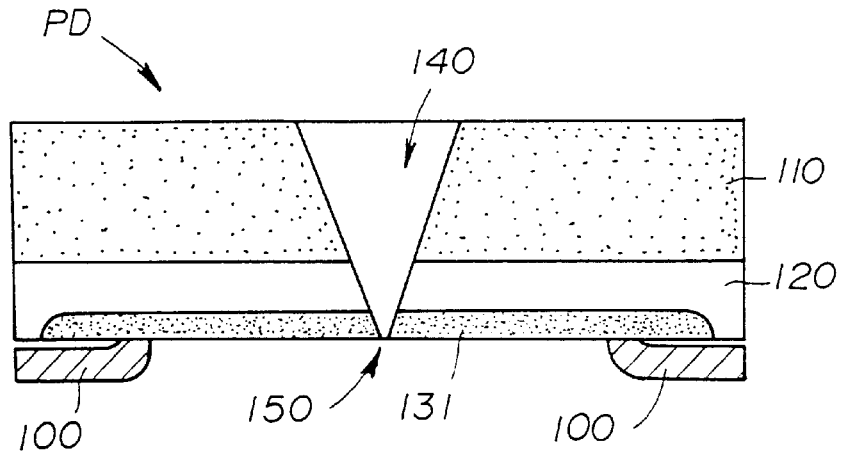
FIG. 27 shows a general essential-portion sectional view of a near field optical probe devised by the inventors of the present application.

In the above-mentioned literature (1) ('Near Field Optics and Its Application to Optical Memory'), it is proposed to integrate so as to combine an aperture and a semiconductor photodetector (photodiode: PD) so as to obtain an arrangement of a near field optical probe. In order to put such an arrangement into practical use, the inventors of the present application have devised an arrangement shown in FIG. 27, for example, in which arrangement a through hole and an aperture are formed in a common PIN photodiode. This arrangement is an example of a near field optical probe in which a through hole 140 having an aperture 150 is provided in a semiconductor photodetector (PD) which includes a first-conductive-type high-concentration impurity layer 110, a first-conductive-type low-concentration impurity layer 120 and a second-conductive-type impurity-introduced region 131. Metal wiring elements 100 are connected to the secondconductive-type impurity-introduced region 131. FIG. 27 shows an example in which the first conductive type is the n type and the second conductive type is the p type.

In the near field optical probe having the above-described arrangement, the second-conductive-type impurity-introduced region 131 acts as the light-receiving region of the semiconductor photodetector (PD). However, when this area is large, the capacitance of the pn conjunction is large. Generally speaking, the response speed of a semiconductor photodiode is determined by the CR time constant and the running time of carriers in a depletion layer. Therefore, when the capacitance of the pn junction is large, C of the CR time constant is large. Thereby, a high-speed operation of not only the semiconductor photodetector but also the near field optical probe is prevented. This problem becomes further remarkable in a case where the surface area of the near field optical probe becomes larger as a result of a plurality of through holes, each having an aperture, being provided so as to form an array.

Further, in accordance with an optical principle, it is necessary to locate an aperture in a surface in proximity to a to-be-observed-and-measured object or a recording/reproducing medium so that the distance therebetween should be equal to or less than an amount on the order of tens of nm. However, in the near field optical probe shown in FIG. 27, the metal wiring elements 100 are formed to project, on the order of hundreds of nm, from the surface of the light-receiving region of the photodetector. These wiring elements prevent the near field optical probe from being located in proximity to the object.

The wiring elements (terminals) of the photodetector should be electrically connected to an external light detection circuit or the like. However, it is difficult for especially the wiring elements on the light-receiving surface side to be extended to the rear side while projection thereof on the side of the light-receiving (front) surface is avoided.

Tenth through thirteenth embodiments of near field optical probes according to the present invention have been devised in consideration of the above-described situation, and an object of the present invention is to provide a near field optical probe on which the optical near field is generated from an aperture, and it is possible to perform a light detecting operation stably with high sensitivity.

More specifically, an object of the present invention is to provide a near field optical probe in which, whether a single aperture is provided or a plurality of apertures are provided, the CR time constant of a semiconductor photodetector is prevented from increasing, and a high-speed operation can be performed.

Another object is to provide a near field optical probe which can be located in proximity to an object so that the distance therebetween should be equal to or less than an amount on the order of tens of nm.

Another object is to provide an arrangement which enables electric connection from a terminal of a photodetector on a light-receiving surface side to a rear surface side.

Figure 28:
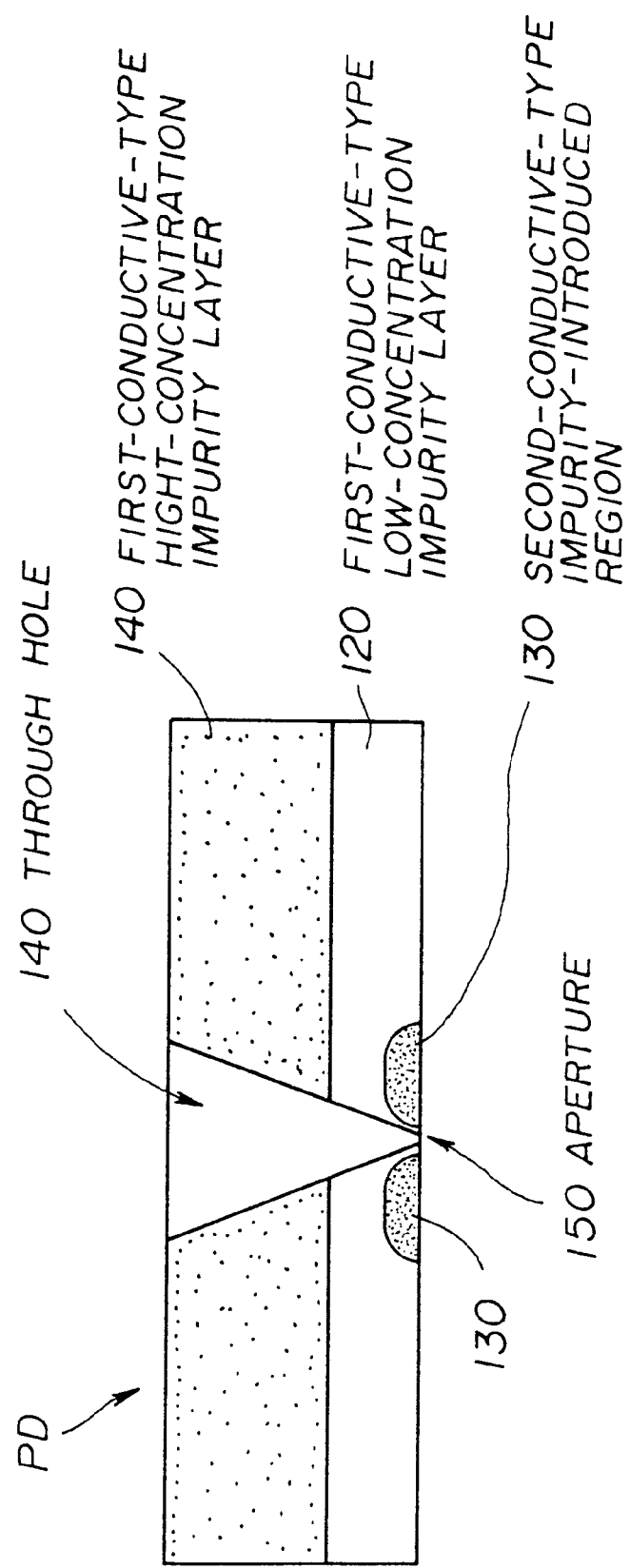
FIG. 28 shows a general essential-portion sectional view of a tenth embodiment of a near field optical probe according to the present invention.

The semiconductor photodetector used in each of the tenth through thirteenth embodiments of the near field optical probes according to the present invention is a common PIN photodiode. For example, as shown in FIG. 28, the semiconductor photodetector includes at least a first-conductive-type high-concentration impurity layer 110, a first-conductive-type low-concentration impurity layer 120 and a second-conductive-type impurity-introduced region 130. As the above-mentioned first-conductive-type high-concentration impurity layer 110, for example, a silicon (Si) substrate doped with antimony (Sb) in high concentration, and which has a resistivity on the order of 0.01 Ωcm can be considered. As the first-conductivity-type low-concentration impurity layer 120, a silicon epitaxial layer doped with phosphorus (P) and which has a resistivity of equal to or more than an amount on the order of 100 Ωcm can be considered. As the second-conductive-type impurity-introduced region 130, a region resulting from boron (B) being diffused in the above-mentioned first-conductive-type low-concentration impurity layer can be considered. In this case, the p+n– n+ type photodetector is obtained. However, it is also possible to invert the conductivity types so as to obtain the n+ p– p+ type photodetector. Wiring elements, not shown in the figure, are connected to the first-conductivity-type high-concentration impurity layer 110 and the second-conductivity-type impurity-introduced region 130, and, thereby, conductive paths to a light detection circuit are formed.

Further, in the above-mentioned photodetector, a through hole 140 having an aperture 150 is provided. As a method for forming the through hole, a method in which anisotropic etching using the plane orientation of the silicon crystal is used, as disclosed in the above-mentioned literature (1) ('Near Field Optics and Its Application to Optical Memory'), may be used, or a common dry or wet etching may be used.

Arrangements and operations of the tenth through thirteenth embodiments of the near field optical probes according to the present invention, shown in figures, will now be described.

In the tenth embodiment of the near field optical probe according to the present invention, a light-receiving region of a semiconductor photodetector is provided in such a manner that the light-receiving region is limited to the proximity of an aperture. This means that the light-receiving region is formed in the proximity of the aperture in such a manner that the area of the light-receiving region is a necessary and minimum area. It is preferable that the shape of the light-receiving region be a circle or a polygon, the center of which is the center of the aperture, or, in a case where light to be received is biased in a specific direction, be a shape, the center of which is eccentric in this direction. Thus, it is preferable that the shape of the light-receiving region be suited to the shape of the area on which light to be received is incident. Reduction in the size of the light-receiving region contributes to reduction in the junction capacitance. However, when the size of the light-receiving region is too small, the light-detection sensitivity decreases due to decrease in the light-receiving area. Therefore, it is possible to set the optimum size through trade-off between the junction capacitance and the light-detection sensitivity. For example, it is preferable that the size of the light-receiving region be a half through ten times the distance from the surface in which the aperture is formed to the center of emission or the center of diffusion of the light to be received. Further, when the light-receiving region having a size which is a minimum one determined from the limitation according to the process of manufacturing the photodetector can provide a sufficient light-receiving area, the size of the light-receiving region should be the size which is the minimum one determined from the limitation according to the process of manufacturing the photodetector.

FIG. 28 shows a general essential-portion sectional view of the tenth embodiment of the near field optical probe according to the present invention. As described above, this near field optical probe has an arrangement in which the through hole 140 having the aperture 150 is provided in the substrate in which the semiconductor photodetector (PD) is formed, which semiconductor photodetector includes the first-conductive-type high-concentration impurity layer 110, the first-conductive-type low-concentration impurity layer 120 and the second-conductive-type impurity-introduced region 130. The second-conductive-type impurity-introduced region 130, which acts as the light-receiving region of the semiconductor photodetector (PD), is provided only in the proximity of the aperture 150.

Thereby, in comparison to the case where the second-conductive-type impurity-introduced region 131 is formed approximately through the entire surface of the substrate as shown in FIG. 27, it is possible to remarkably reduce the area in which the conjunction capacitance is formed, and to achieve high-speed response of the semiconductor photodetector.

Figure 29:
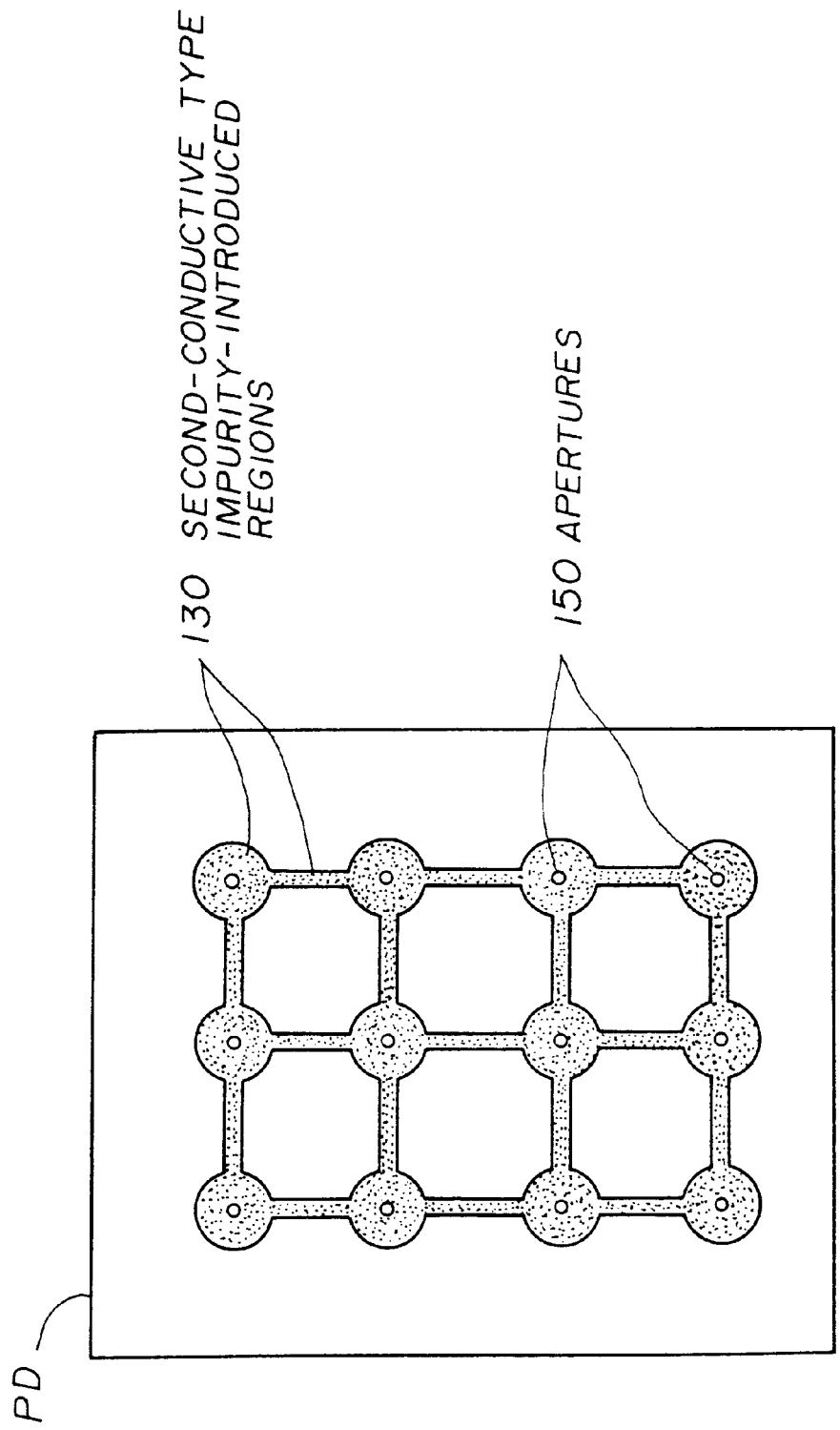
FIG. 29 shows a light-receiving-portion-side plan view of an eleventh embodiment of a near field optical probe according to the present invention.

FIG. 29 shows a light-receiving-portion-side plan view of the eleventh embodiment of the near field optical probe according to the present invention. The sectional view of the eleventh embodiment of the near field optical probe according to the present invention around each through hole having an aperture is approximately the same as that of the tenth embodiment of the near field optical probe according to the present invention shown in FIG. 28. However, as shown in FIG. 29, in the eleventh embodiment of the near field optical probe according to the present invention, a plurality of arrangements are arranged so as to form an array, in each of which arrangement a second-conductive-type impurity-introduced region which is a light-receiving region is provided only in the proximity of the aperture, and the respective light-receiving regions are electrically connected with each other. As an arrangement for electrically connecting the respective light-receiving regions, in the example shown in FIG. 29, when the second-conductive-type impurity-introduced regions 130 are formed, with the formation of the circular light-receiving-region portion surrounding each aperture 150, each of portions between the adjacent light-receiving regions is thinned so that the connection lines are formed integrally and inseparably. As another connection example, it is possible to connect between the light-receiving regions through metal wiring elements instead of the thin lines of the impurity-introduced regions.

Further, formation of channel stoppers, formed of first-conductive-type impurity-introduced regions having shapes such as to provide fixed distances from the second-conductive-type impurity-introduced regions 130 in the same plane as that of the second-conductive-type impurity-introduced regions 130, is effective to prevent leakage currents from developing. This effect is the same as that which can be produced in a case of a common light-receiving element (semiconductor photodetector).

The above-mentioned arrangement is supposed to be used as a single photodetector as a result of the light-receiving regions being jointed through the thin line portions and thus integrated. However, it is also possible that the plurality of light-receiving regions (second-conductive-type impurity-introduced regions) 130 are used independently of each other. In this case, it is necessary to provide a wiring element for addressing each light-receiving region. Therefore, the number of the light-receiving regions is limited due to an arrangement of the wiring elements, or it is necessary to provide the wiring elements in a multi-layer arrangement.

Figure 30:
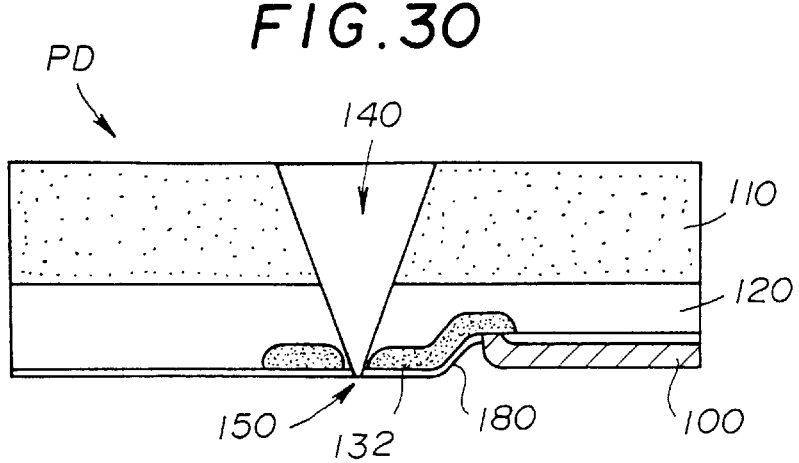
FIG. 30 shows a general essential-portion sectional view of a twelfth embodiment of a near field optical probe according to the present invention.

FIG. 30 shows a general essential-portion sectional view of the twelfth embodiment of the near field optical probe according to the present invention. The sectional view of this near field optical probe shown in FIG. 30 is approximately the same as that shown in FIG. 28. However, as shown in FIG. 30, in the twelfth embodiment of the near field optical probe according to the present invention, a metal wiring layer 100 to be connected to a second-conductive-type impurity-introduced region 132 which is a light-receiving region of a photodetector (PD) is provided, and the surface of the metal wiring layer 100 is located to be sunk inward so as to be higher (in the figure) than the surface of an aperture 150 as shown in FIG. 30. Thereby, the surface of the aperture 150 is located at the lowest position on the light-receiving surface (facing downward in the figure) of the probe. As a result, it is possible to locate the aperture 150 in the proximity of an object.

Such an arrangement can be provided as a result of, prior to formation of the second-conductive-type impurity-introduced region 132 which is the light-receiving region, for the portion of a first-conductive-type low-concentration impurity layer 120, in which portion the metal wiring layer 100 will be provided, the surface of the first-conductive-type low-concentration impurity layer 120 being dented through photolithography and etching such as mesa etching or the like, or the space in which the metal wiring layer 100 will be provided being formed in the surface of the first-conductive-type low-concentration impurity layer 120 as a result of first an oxide film being caused to grow upward (in the figure) from the surface, and, then, the oxide film being removed.

Further, when a dielectric film such as an oxide film 180 is provided on the surface of the light-receiving portion and on the portion on which the metal wiring layer is laminated, it is possible to protect the surface and to provide insulation between the metal wiring layer 100 and the substrate.

Further, it is possible to apply the above-described arrangement in the twelfth embodiment of the near field optical probe according to the present invention to a near field optical probe having an array arrangement such as that in the eleventh embodiment of the near field optical probe according to the present invention shown in FIG. 29.

Figure 31:
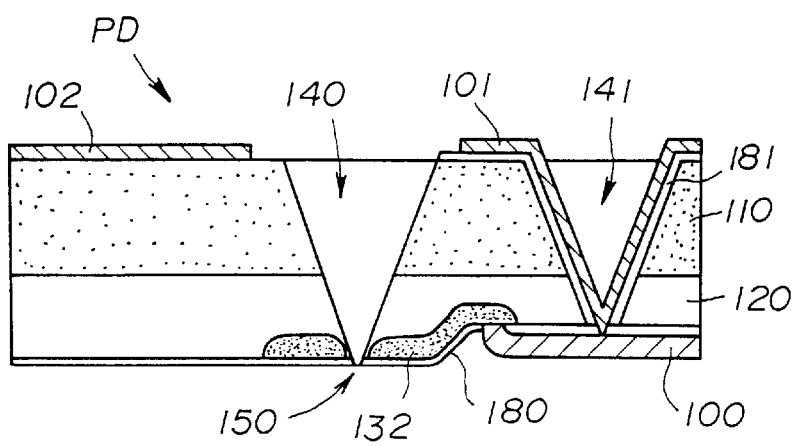
FIG. 31 shows a general essential-portion sectional view of a thirteenth embodiment of a near field optical probe according to the present invention.

FIG. 31 shows a general essential-portion sectional view of the thirteenth embodiment of the near field optical probe according to the present invention. The thirteenth embodiment of the near field optical probe according to the present invention is approximately the same as the near field optical probe shown in FIG. 30. However, a wiring layer (extending wiring element) 101 for electrically connecting to a second-conductive-type impurity-introduced region 132 which is a light-receiving region of a photodetector (PD) is provided along a through hole 141 for wiring provided in a substrate in which the photodetector is formed. The light-receiving region 132 and extending wiring element 101 are electrically connected with one another through a metal wiring element 100.

It is possible to obtain such an arrangement without adding a new process by forming the through hole 141 for wiring in the same process in which a through hole 140 for generating the optical near field is formed.

Further, it is preferable to provide a dielectric layer 181 for insulation between the extending wiring element 101 and the surface of the through hole 141 for wiring. By extending the extending wiring element 101 and dielectric layer 181 to the rear-surface (the top surface, in the figure) of the substrate as shown in the figure, it is possible to form the extending wiring element 101 on the same surface on which a rear-side wiring element 102 of the semiconductor photodetector is formed. This arrangement is advantageous when a mounting method using various metal bumps or anisotropic conductive members is used for this near field optical probe.

Further, instead of providing the extending wiring element 101 through the through hole 141 for wiring as shown in FIG. 31, it is also possible to provide the extending wiring element through the through hole 140 for generating the optical near field.

Figure 32:
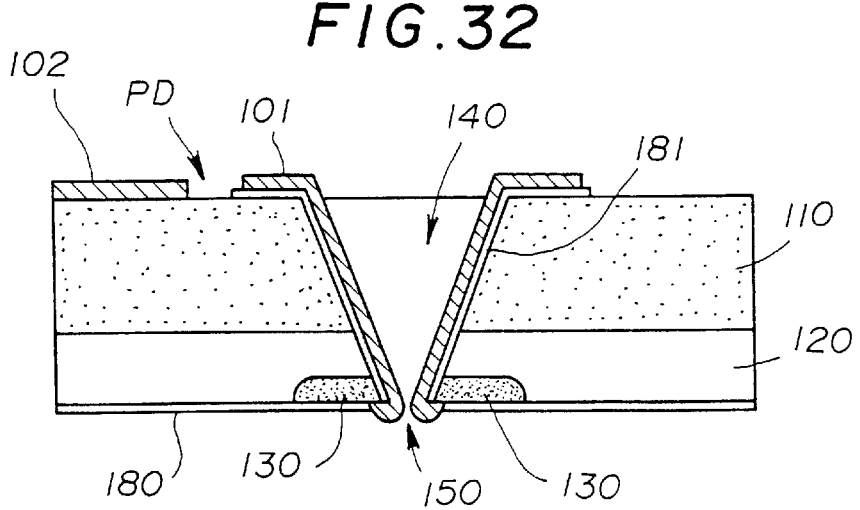
FIG. 32 shows a general essential-portion sectional view of a fourteenth embodiment of a near field optical probe according to the present invention.

FIG. 32 shows a general essential-portion sectional view of the fourteenth embodiment of the near field optical probe according to the present invention. The fourteenth embodiment of the near field optical probe according to the present invention is approximately the same as the near field optical probe shown in FIG. 28. However, a wiring layer (extending wiring element) 101 for electrically connecting to a second-conductive-type impurity-introduced region 130 which is a light-receiving region of a photodetector (PD) is provided along a through hole 140 for generating the optical near field provided in a substrate in which the photodetector is formed. The extending wiring element 101 is electrically connected to the light-receiving region 130 around an aperture 150.

When a dielectric film such as an oxide film 180 is provided on the surface of the light-receiving portion, it is possible to protect the surface.

Further, it is preferable to provide a dielectric layer 181 for insulation between the extending wiring element 101 and the surface of the through hole 140 for generating the optical near field. By extending the extending wiring element 101 and dielectric layer 181 to the rear-surface (the top surface, in the figure) of the substrate as shown in the figure, it is possible to form the extending wiring element 101 on the same surface on which a rear-side wiring element 102 of the semiconductor photodetector is formed. This arrangement is advantageous when a mounting method using various metal bumps or anisotropic conductive members is used for this near field optical probe.

Further, the present invention is not limited to the above-described embodiments, and variations and modifications may be made without departing from the scope of the present invention.

The present application is based on Japanese priority application Nos. 10-334505, 10-334506 and 11-151923, filed on Nov. 25, 1998, Nov. 25, 1998 and May 31, 1999, respectively, the entire contents of which are hereby incorporated by reference.

What is claimed is:

1. A near field optical probe comprising:
   a semiconductor photodetector including at least a first-conductive-type high-concentration impurity layer, a first-conductive-type low-concentration impurity layer and a second-conductive-type impurity-introduced region; and
   a through hole extending through said photodetector and having an aperture, wherein said through hole passes through said first-conductive-type high-concentration impurity layer and said first-conductive-type low-concentration impurity layer.

2. A method for manufacturing a near field optical probe in which a through hole having an aperture is provided in a semiconductor photodetector including at least a first-conductive-type high-concentration impurity layer, a first-conductive-type low-concentration impurity layer and a second-conductivity-type impurity-introduced region, said method comprising the steps of:
   (a) forming said second-conductive-type impurity-introduced region in the surface of said first-conductive-type low-concentration impurity layer of a semiconductor substrate having said first-conductive-type high-concentration impurity layer and first-conductive-type low-concentration impurity layer;
   (b) forming said through hole, which passes through said first-conductive-type high-concentration impurity layer and first-conductive-type low-concentration impurity layer, from the side of said first-conductive-type, high-concentration impurity layer, after said step a); and
   (c) forming said aperture in said second-conductive-type impurity-introduced region, after said step b).

3. A method for manufacturing a near field optical probe in which a through hole having an aperture is provided in a semiconductor photodetector including at least a first-conductive-type high-concentration impurity layer, a first-conductive-type low-concentration impurity layer and a second-conductivity impurity-introduced region, said method comprising the steps of:
   a) providing said through hole, which passes through said first-conductive-type high-concentration impurity layer and first-conductive-type low-concentration impurity layer, in a semiconductor substrate having said first-conductive-type high-concentration impurity layer and first-conductive-type low-concentration impurity layer, from the side of said first-conductive-type high-concentration impurity layer; and
   b) forming said second-conductive-type impurity-introduced region in the surface of said first-conductive-type low-concentration impurity layer, after said step a).

4. A near field optical probe comprising:
   a semiconductor photodetector including at least a first-conductive-type high-concentration impurity layer, a first-conductive-type low-concentration impurity layer and a second-conductive-type impurity-introduced region; and
   a through hole extending through said photodetector and having an aperture, wherein said through hole passes through said first-conductive-type high-concentration impurity layer and said first-conductive-type low-concentration impurity layer, and said second-conductive-type impurity-introduced region is separated from said aperture.

5. A near field optical probe in which a through hole having an aperture is provided in a semiconductor photodetector including at least a first-conductive-type high-concentration impurity layer, a first-conductive-type low-concentration impurity layer and a second-conductivity-type impurity-introduced region,
   wherein said through hole is surrounded by a ring-shaped first-conductive-type high-concentration impurity region provided along the direction of said through hole in said first-conductive-type low-concentration layer.

6. The near field optical probe as claimed in claim 5, wherein said ring-shaped first-conductive-type high-concentration impurity region is provided so as to be connected to said first-conductive-type high-concentration impurity layer.

7. A near field optical probe in which a through hole having an aperture is provided in a semiconductor photodetector including at least a first-conductive-type high-concentration impurity layer, a first-conductive-type low-concentration impurity layer and a second-conductivity impurity-introduced region,
   wherein a first-conductive-type high-concentration impurity-introduced region is provided at a portion spreading from and in the proximity of the surface of said first-conductive-type low-concentration impurity layer, has a plane shape containing said aperture and is separate from said second-conductive-type impurity-introduced region.

8. The near field optical probe as claimed in claim 7, wherein said through hole is surrounded by a ring-shaped first-conductive-type high-concentration impurity region extending along the direction of said through hole in said first-conductive-type low-concentration impurity layer, and, also, said ring-shaped first-conductive-type high-concentration impurity region is provided so as to be connected to said first-conductive-type high-concentration impurity-introduced region having said plane shape containing said aperture and formed separate from said second-conductive-type impurity-introduced region.

9. The near field optical probe as claimed in claim 4, wherein a dielectric film is provided on the surface, of at least said first-conductive-type low-concentration impurity layer, of said through hole.

10. The near field optical probe as claimed in claim 5, wherein a dielectric film is provided on the surface, of at least said first-conductive-type low-concentration impurity layer, of said through hole.

11. The near field optical probe as claimed in claim 6, wherein a dielectric film is provided on the surface, of at least said first-conductive-type low-concentration impurity layer, of said through hole.

12. The near field optical probe as claimed in claim 7, wherein a dielectric film is provided on the surface, of at least said first-conductive-type low-concentration impurity layer, of said through hole.

13. The near field optical probe as claimed in claim 8, wherein a dielectric film is provided on the surface, of at least said first-conductive-type low-concentration impurity layer, of said through hole.

14. A method for manufacturing the near field optical probe claimed in claim 5, comprising the step of impurity diffusion using an impurity in a gas phase, which step is performed when said ring-shaped first-conductive-type high-concentration impurity region extending along the direction of said through hole is formed.

15. A method for manufacturing the near field optical probe claimed in claim 6, comprising the step of impurity diffusion using an impurity in a gas phase, which step is performed when said ring-shaped first-conductive-type high-concentration impurity region extending along the direction of said through hole is formed.

16. A method for manufacturing the near field optical probe claimed in claim 8, comprising the step of impurity diffusion using an impurity in a gas phase, which step is performed when said ring-shaped first-conductive-type high-concentration impurity region extending along the direction of said through hole is formed.

17. A near field optical probe, comprising:
a semiconductor photodetector including at least a first-conductive-type high-concentration impurity layer, a first-conductive-type low-concentration impurity layer and a second-conductive-type impurity-introduced region;
a through hole extending through said photodetector and having an aperture; and
a dielectric film provided on the surface of at least said first-conductive-type low-concentration impurity layer of said through hole;
wherein said second-conductive-type impurity-introduced region is separated from said aperture and said through hole is formed by impurity diffusion using an impurity in a gas phase, the diffusion being performed when a ring-shaped first-conductive-type high-concentration impurity region extending along the direction of said through hole is formed.

18. A method for manufacturing the near field optical probe claimed in claim 10, comprising the step of impurity diffusion using an impurity in a gas phase, which step is performed when said ring-shaped first-conductive-type high-concentration impurity region extending along the direction of said through hole is formed.

19. A method for manufacturing the near field optical probe claimed in claim 11, comprising the step of impurity diffusion using an impurity in a gas phase, which step is performed when said ring-shaped first-conductive-type high-concentration impurity region extending along the direction of said through hole is formed.

20. A method for manufacturing the near field optical probe claimed in claim 12, comprising the step of impurity diffusion using an impurity in a gas phase, which step is performed when a ring-shaped first-conductive-type high-concentration impurity region extending along the direction of said through hole is formed.

21. A method for manufacturing the near field optical probe claimed in claim 13, comprising the step of impurity diffusion using an impurity in a gas phase, which step is performed when said ring-shaped first-conductive-type high-concentration impurity region extending along the direction of said through hole is formed.

22. A near field optical probe comprising:
a semiconductor photodetector including at least a first-conductive-type high-concentration impurity layer, a first-conductive-type low-concentration impurity layer and a second-conductive-type impurity-introduced region;
a through hole extending through said photodetector and having an aperture;
a dielectric film provided on the surface of at least said first-conductivity-type low-concentration impurity layer of said through hole; and
metal films provided on the surface of said through hole and the surface of said first-conductive-type high-concentration impurity layer,
wherein said second-conductive-type impurity-introduced region is separated from said aperture.

23. The near field optical probe as claimed in claim 5, wherein metal films are provided on the surface of said through hole and the surface of said first-conductive-type high-concentration impurity layer.

24. The near field optical probe as claimed in claim 6, wherein metal films are provided on the surface of said through hole and the surface of said first-conductive-type high-concentration impurity layer.

25. The near field optical probe as claimed in claim 7, wherein metal films are provided on the surface of said through hole and the surface of said first-conductive-type high-concentration impurity layer.

26. The near field optical probe as claimed in claim 8, wherein metal films are provided on the surface of said through hole and the surface of said first-conductive-type high-concentration impurity layer.

27. A near field optical probe comprising:
a semiconductor photodetector including at least a first-conductive-type high-concentration impurity layer, a first-conductive-type low-concentration impurity layer and a second conductivity-type impurity-introduced region;
a through hole extending through said photodetector and having an aperture;
a dielectric film provided on the surface of at least said first-conductivity-type low-concentration impurity layer of said through hole; and metal films provided on the surface of said through hole so as to cover said dielectric film and on the surface of said first-conductivity-type high-concentration impurity layer, wherein said second-conductive-type impurity-introduced region is separated from said aperture.

28. The near field optical probe as claimed in claim 10, wherein metal films are provided on the surface of said through hole so as to cover said dielectric film and on the surface of said first-conductive-type high-concentration impurity layer.

29. The near field optical probe as claimed in claim 11, wherein metal films are provided on the surface of said through hole so as to cover said dielectric film and on the surface of said first-conductive-type high-concentration impurity layer.

30. The near field optical probe as claimed in claim 12, wherein metal films are provided on the surface of said through hole so as to cover said dielectric film and on the surface of said first-conductive-type high-concentration impurity layer.

31. The near field optical probe as claimed in claim 13, wherein metal films are provided on the surface of said through hole so as to cover said dielectric film and on the surface of said first-conductive-type high-concentration impurity layer.

32. A method for manufacturing the near field optical probe as claimed in claim 22, further comprising the step of forming, at the same time, the metal film on said surface of said through hole and the metal film on said surface of said first-conductive-type high-concentration impurity layer.

33. A method for manufacturing the near field optical probe as claimed in claim 23, further comprising the step of forming, at the same time, the metal film on said surface of said through hole and the metal film on said surface of said first-conductive-type high-concentration impurity layer.

34. A method for manufacturing the near field optical probe claimed in claim 24, comprising the step of forming, at the same time, the metal film on said surface of said through hole and the metal film on said surface of said first-conductive-type high-concentration impurity layer.

35. A method for manufacturing the near field optical probe claimed in claim 25, comprising the step of forming, at the same time, the metal film on said surface of said through hole and the metal film on said surface of said first-conductive-type high-concentration impurity layer.

36. A method for manufacturing the near field optical probe claimed in claim 26, comprising the step of forming, at the same time, the metal film on said surface of said through hole and the metal film on said surface of said first-conductive-type high-concentration impurity layer.

37. A method for manufacturing the near field optical probe claimed in claim 27, comprising the step of forming, at the same time, the metal film on said surface of said through hole so as to cover said dielectric film and the metal film on said surface of said first-conductive-type high-concentration impurity layer.

38. A method for manufacturing the near field optical probe claimed in claim 28, comprising the step of forming, at the same time, the metal film on said surface of said through hole so as to cover said dielectric film and the metal film on said surface of said first-conductive-type high-concentration impurity layer.

39. A method for manufacturing the near field optical probe claimed in claim 29, comprising the step of forming, at the same time, the metal film on said surface of said through hole so as to cover said dielectric film and the metal film on said surface of said first-conductive-type high-concentration impurity layer.

40. A method for manufacturing the near field optical probe claimed in claim 30, comprising the step of forming, at the same time, the metal film on said surface of said through hole so as to cover said dielectric film and the metal film on said surface of said first-conductive-type high-concentration impurity layer.

41. A method for manufacturing the near field optical probe claimed in claim 31, comprising the step of forming, at the same time, the metal film on said surface of said through hole so as to cover said dielectric film and the metal film on said surface of said first-conductive-type high-concentration impurity layer.

* * * * *